United States Patent
Cha et al.

(10) Patent No.: US 10,095,399 B2
(45) Date of Patent: Oct. 9, 2018

(54) METHOD AND APPARATUS FOR SELECTING REGION ON SCREEN OF MOBILE DEVICE

(75) Inventors: Sang-ok Cha, Daegu (KR); Tae-young Kang, Seoul (KR); Yeon-hee Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 13/228,024

(22) Filed: Sep. 8, 2011

(65) Prior Publication Data

US 2012/0056836 A1    Mar. 8, 2012

(30) Foreign Application Priority Data

Sep. 8, 2010  (KR) .................. 10-2010-0088042

(51) Int. Cl.
| | | |
|---|---|---|
| *G06F 3/0486* | (2013.01) | |
| *G06F 3/0485* | (2013.01) | |
| *G06F 3/0484* | (2013.01) | |
| *G06F 3/0488* | (2013.01) | |
| G06F 3/041 | (2006.01) | |

(52) U.S. Cl.
CPC .......... *G06F 3/0486* (2013.01); *G06F 3/0485* (2013.01); *G06F 3/04842* (2013.01); *G06F 3/04883* (2013.01); *G06F 3/0412* (2013.01)

(58) Field of Classification Search
CPC ............... G06F 3/04842; G06F 3/0486; G06F 3/04883; G06F 3/0488; G06F 3/0845; G06F 3/048; G06F 3/0484; G06F 3/0416; G06F 2203/04808; G06F 3/0412; G06F 2203/04104; G06F 3/041

USPC .................. 345/173–179; 178/18.01–20.04; 715/856–862; 349/58, 60
See application file for complete search history.

(56) References Cited

U.S. PATENT DOCUMENTS

| | | | |
|---|---|---|---|
| 6,411,283 B1 * | 6/2002 | Murphy ............. | G06F 3/03543 345/163 |
| 7,656,393 B2 | 2/2010 | King et al. | |
| 7,752,563 B2 * | 7/2010 | Ice ........................ | G06F 3/0482 345/168 |
| 8,239,785 B2 * | 8/2012 | Hinckley et al. ............. | 715/863 |
| 8,751,970 B2 * | 6/2014 | Hinckley et al. ............. | 715/863 |
| 8,782,557 B2 * | 7/2014 | Dernis ................ | G06F 3/04817 715/790 |
| 8,799,827 B2 * | 8/2014 | Hinckley et al. ............. | 715/863 |

(Continued)

FOREIGN PATENT DOCUMENTS

| | | |
|---|---|---|
| CN | 101482785 | 7/2009 |
| CN | 101620507 | 1/2010 |

(Continued)

OTHER PUBLICATIONS

Japanese Office Action dated Jun. 22, 2015 issued in counterpart application No. 2013-528122, 5 pages.

(Continued)

*Primary Examiner* — Sanjiv D Patel
(74) *Attorney, Agent, or Firm* — The Farrell Law Firm, P.C.

(57) ABSTRACT

Provided are a method and apparatus for selecting a region on a screen of a device. The method includes recognizing a signal due to dragging from outside of the screen of the device, and determining a selection region based on a location where the drag is released.

15 Claims, 31 Drawing Sheets

(56) References Cited

U.S. PATENT DOCUMENTS

| | | | |
|---|---|---|---|
| 8,836,648 B2* | 9/2014 | Wilairat | G06F 3/04883 178/18.01 |
| 9,041,663 B2 | 5/2015 | Westerman | |
| 2002/0122029 A1* | 9/2002 | Murphy | 345/173 |
| 2005/0052427 A1* | 3/2005 | Wu | G06F 3/04883 345/173 |
| 2005/0149882 A1* | 7/2005 | Iwema et al. | 715/860 |
| 2005/0248542 A1 | 11/2005 | Sawanobori | |
| 2006/0001650 A1* | 1/2006 | Robbins | G06F 3/0421 345/173 |
| 2006/0250372 A1* | 11/2006 | Lii | 345/173 |
| 2007/0008298 A1* | 1/2007 | Ohta | 345/173 |
| 2007/0152984 A1* | 7/2007 | Ording | G06F 3/04845 345/173 |
| 2007/0273668 A1 | 11/2007 | Park et al. | |
| 2007/0277126 A1* | 11/2007 | Park et al. | 715/866 |
| 2008/0040686 A1* | 2/2008 | Ice | G06F 3/0482 715/823 |
| 2008/0132333 A1* | 6/2008 | Kogo | G06F 3/04883 463/37 |
| 2008/0316181 A1 | 12/2008 | Nurmi | |
| 2009/0085878 A1* | 4/2009 | Heubel | G06F 3/016 345/173 |
| 2009/0140998 A1 | 6/2009 | Jung et al. | |
| 2009/0174679 A1* | 7/2009 | Westerman | G06F 3/03547 345/173 |
| 2009/0228842 A1 | 9/2009 | Westerman et al. | |
| 2009/0228901 A1* | 9/2009 | Beaver et al. | 719/318 |
| 2009/0288044 A1* | 11/2009 | Matthews | G06F 3/0482 715/863 |
| 2010/0005390 A1 | 1/2010 | Bong | |
| 2010/0050076 A1* | 2/2010 | Roth | G06F 3/04883 715/702 |
| 2010/0079499 A1* | 4/2010 | Scott | G06F 3/04883 345/661 |
| 2010/0088641 A1 | 4/2010 | Choi | |
| 2010/0088653 A1* | 4/2010 | Yach | G06F 3/0488 715/863 |
| 2010/0107067 A1* | 4/2010 | Vaisanen | G06F 3/0486 715/702 |
| 2010/0214249 A1* | 8/2010 | Ikeda | G06F 3/04883 345/173 |
| 2010/0245261 A1* | 9/2010 | Karlsson | G06F 3/0233 345/173 |
| 2010/0245274 A1* | 9/2010 | Fukuda | 345/173 |
| 2010/0302172 A1* | 12/2010 | Wilairat | 345/173 |
| 2011/0037714 A1* | 2/2011 | Seo | G06F 3/0482 345/173 |
| 2011/0074809 A1* | 3/2011 | Chen | G06F 3/0488 345/619 |
| 2011/0093821 A1* | 4/2011 | Wigdor | G06F 3/04812 715/863 |
| 2011/0102354 A1* | 5/2011 | Fuyuno | G06F 1/1616 345/173 |
| 2011/0175827 A1* | 7/2011 | Bogue | G06F 3/0416 345/173 |
| 2012/0304133 A1* | 11/2012 | Nan et al. | 715/863 |
| 2015/0082163 A1 | 3/2015 | Roth | |

FOREIGN PATENT DOCUMENTS

| | | |
|---|---|---|
| CN | 102077161 | 5/2011 |
| EP | 2 077 490 | 7/2009 |
| EP | 2 098 947 | 9/2009 |
| EP | 2 224 321 | 9/2010 |
| EP | 2 299 352 | 3/2011 |
| JP | 2005-321964 | 11/2005 |
| JP | 2006-039819 | 2/2006 |
| JP | 2009-217814 | 9/2009 |
| JP | 2010-049679 | 3/2010 |
| JP | 2010-191892 | 9/2010 |
| KR | 1020070113017 | 11/2007 |
| WO | WO 2009/088672 | 7/2009 |
| WO | WO 2010/001672 | 1/2010 |

OTHER PUBLICATIONS

Chinese Office Action dated Jul. 3, 2015 issued in counterpart application No. 201180043283.2, 11 pages.
Japanese Office Action dated Jan. 25, 2016 issued in counterpart application No. 2013-528122, 3 pages.
Korean Office Action dated Jun. 2, 2016 issued in counterpart application No. 10-2010-0088042, 8 pages.
European Search Report dated Dec. 16, 2016 issued in counterpart application No. 11823794.0-1959, 9 pages.
Volker Roth et al., "Bezel Swipe: Conflict-Free Scrolling and Multiple Selection on Mobile Touch Screen Devices", CHI 2009—Digital Life, New World: Conference Proceedings and Extended Abstracts; the 27th Annual CHI Conference on Human Factors in Computing Systems, Apr. 4-9, 2009, 4 pages.
European Search Report dated Feb. 26, 2018 issued in counterpart application No. 11823794.0-1221, 8 pages.

* cited by examiner

FIG. 10A
FIG. 10B
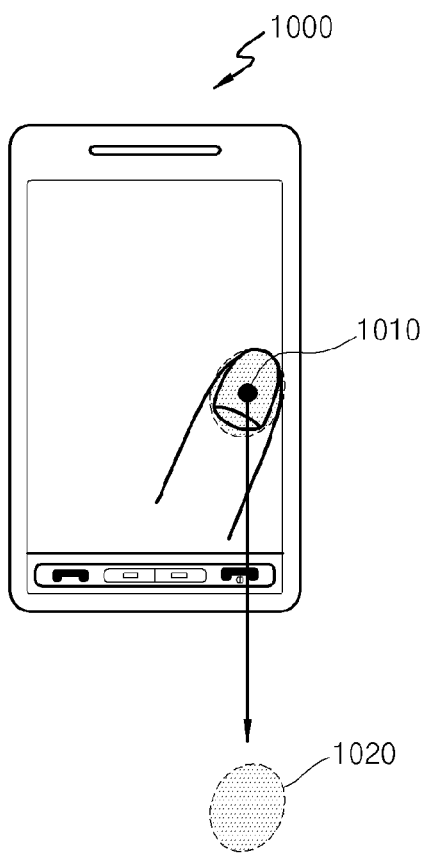
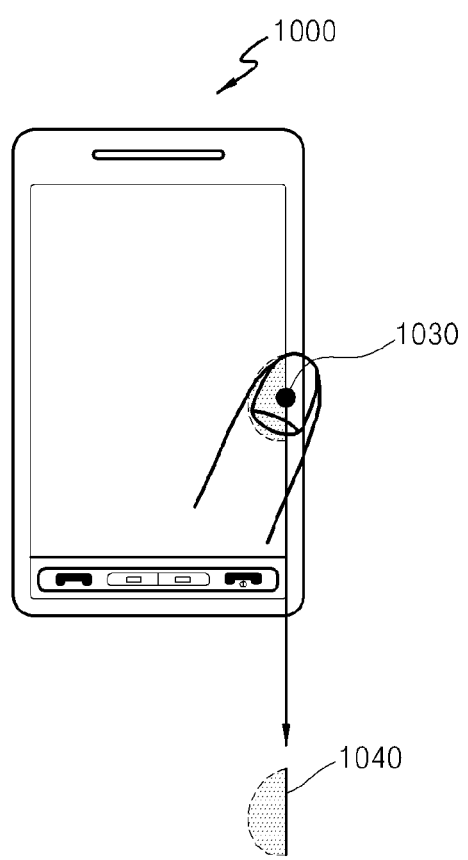
RECOGNIZED AS TOUCH
RECOGNIZED AS OUTSIDE SIGNAL

OUTSIDE OF ACTUAL SCREEN

OUTSIDE OF REGION
DISPLAYING CONTENTS

ME THOD AND APPARATUS FOR
SELECTING REGION ON SCREEN OF
MOBILE DEVICE

PRIORITY

This application claims priority under 35 U.S.C. 119 to Korean Patent Application No. 10-2010-0088042, filed on Sep. 8, 2010, in the Korean Intellectual Property Office, the disclosure of which is incorporated herein in its entirety by reference.

BACKGROUND OF THE INVENTION

1. Field of the Invention

The present invention relates to a method and apparatus for selecting a region on a screen of a device.

2. Description of the Related Art

In order to increase the experience value of interaction, the importance of a multimodal user interface has substantially risen. Also, due to the rapid proliferation of multi-touch technology, the mobile device market has been extended to include a multi-touch screen.

On such a touch screen, a user may perform desired functions and select a part of content or texts. The interaction may be overlapped between such a selection signal and other touch signals, that is, a scroll signal or a panning signal. Thus, in order to achieve accurate signal classification, a long tap duration for selecting content increases, causing a time delay when selecting a desired section.

Also, when an input signal is received, a selection region is arbitrarily designated in a device by itself, and after a user releases the designated selection region, a selection section may be adjusted. Accordingly, it is difficult to simultaneously select a desired section and receive an input signal.

Accordingly, there is a need in the art for a method and apparatus for accurately and rapidly selecting a plurality of contents without confusion with other touch signals in a touch-based mobile device.

SUMMARY OF THE INVENTION

The present invention provides a method and apparatus for selecting a region on a screen, so as to easily and reliably select contents in a mobile device.

According to an aspect of the present invention, there is provided a method of selecting a region on a screen of a device, including recognizing a signal due to dragging from the outside of the screen of the device, and determining a selection region based on a location where the drag is released.

According to another aspect of the present invention, there is provided an apparatus for selecting a region on a screen of a device, the apparatus including a signal recognizing unit for recognizing a signal due to dragging from the outside of the screen of the device, and a selection region determining unit for determining a selection region based on a location where the drag is released.

BRIEF DESCRIPTION OF THE DRAWINGS

The above and other features and advantages of the present invention will become more apparent by describing in detail embodiments thereof with reference to the attached drawings in which:

FIGS. 10A and 10B are views for explaining the method of FIG. 9;

Figure 1:
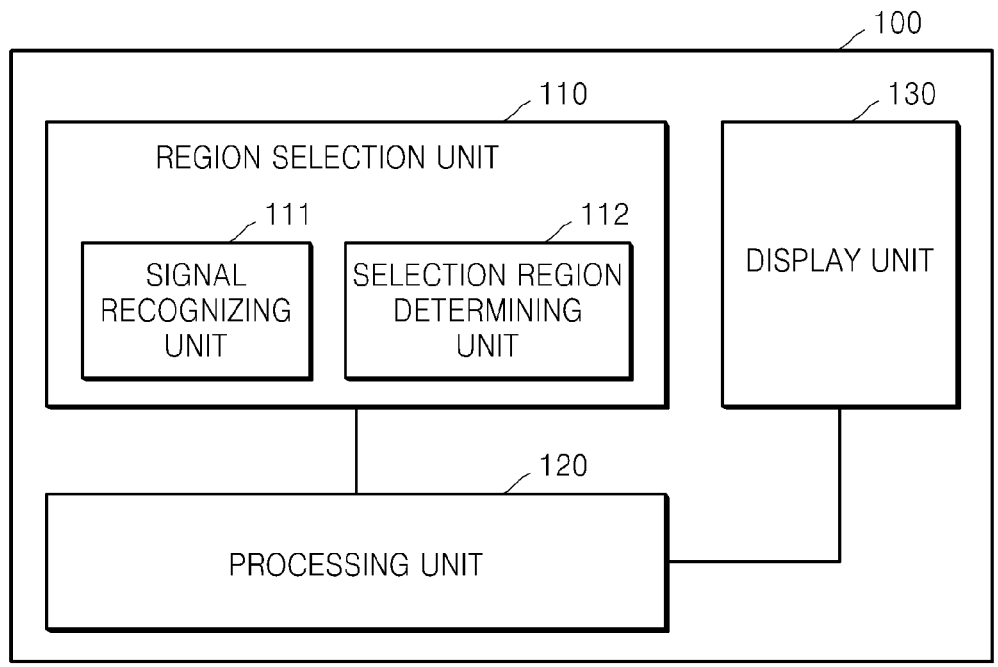
FIG. 1 illustrates a mobile device including a region selection unit, according to the present invention.

DETAILED DESCRIPTION OF EMBODIMENTS
OF THE INVENTION

The present invention will now be described more fully with reference to the accompanying drawings. In the drawings, like reference numerals in the drawings denote like elements, and the thicknesses of elements are accentuated for clarity. Those of ordinary skill in the art will recognize that various changes and modifications of the embodiments described herein can be made without departing from the scope and spirit of the invention. In addition, descriptions of well-known functions and constructions are omitted for the sake of clarity and conciseness.

FIG. 1 illustrates a mobile device 100 including a region selection unit 110, according to the present invention.

Referring to FIG. 1, the mobile device 100 includes the region selection unit 110, a processing unit 120, and a display unit 130.

The region selection unit 110 receives and recognizes an input of a user and thereby selects a region. The region selection unit 110 includes a signal recognizing unit 111 and a selection region determining unit 112. The signal recognizing unit 111 recognizes a signal from a sensor arranged on a touch screen or outside of the touch screen, due to dragging from on the mobile device 110 outside of the touch screen of the mobile device 100. The sensor arranged outside of the touch screen may be any sensor that recognizes a touch or pressure. For example, a plurality of pressure sensors may be installed to recognize pressure or signal content may be analyzed when touching a touch screen, by using an electrostatic capacity method so as to recognize the intensity of pressure.

The selection region determining unit 112 determines a selection region based on a location where dragging is released.

The processing unit 120 processes information received from the region selection unit 110 and controls the display unit 130 so that the determined selection region may be displayed on contents or texts displayed on the display unit 130, based on the processing result.

The display unit 130 displays the determined selection region on the contents or texts according to the control of the processing unit 120. The display unit 130 may be any means known in the art for performing a displaying function.

Although not illustrated in FIG. 1, a storage unit may be further included in the mobile device 100 for storing information or data processed in the processing unit 120, and an input unit for receiving an input of a user may be further provided and realized by the signal recognizing unit 111.

In addition, the present invention may be applied to any product including a touch screen, for example, a Hand Held Product (HHP), a Motion Pictures Experts Group (MPEG) Layer Audio 3 (MP3), a tablet, and a Personal Digital Assistant (PDA)

Figure 2:
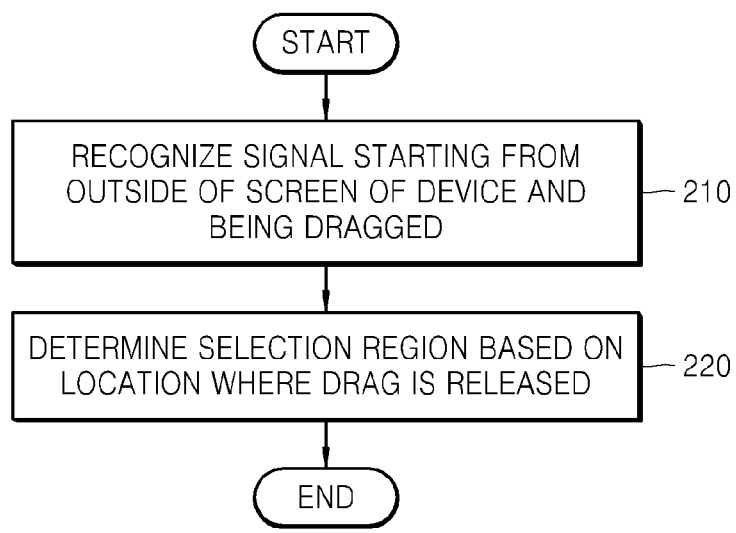
FIG. 2 illustrates a method of selecting a region in the mobile device of FIG. 1, according to the present invention.

FIG. 2 illustrates a method of selecting a region in the mobile device 100, according to the present invention.

Referring to FIG. 2, the signal recognizing unit 111 recognizes a signal starting from outside of a screen of the device and being dragged, in step 210.

Then, the selection region determining unit 112 determines a selection region based on a location where the drag is released, in step 220.

Figure 3:
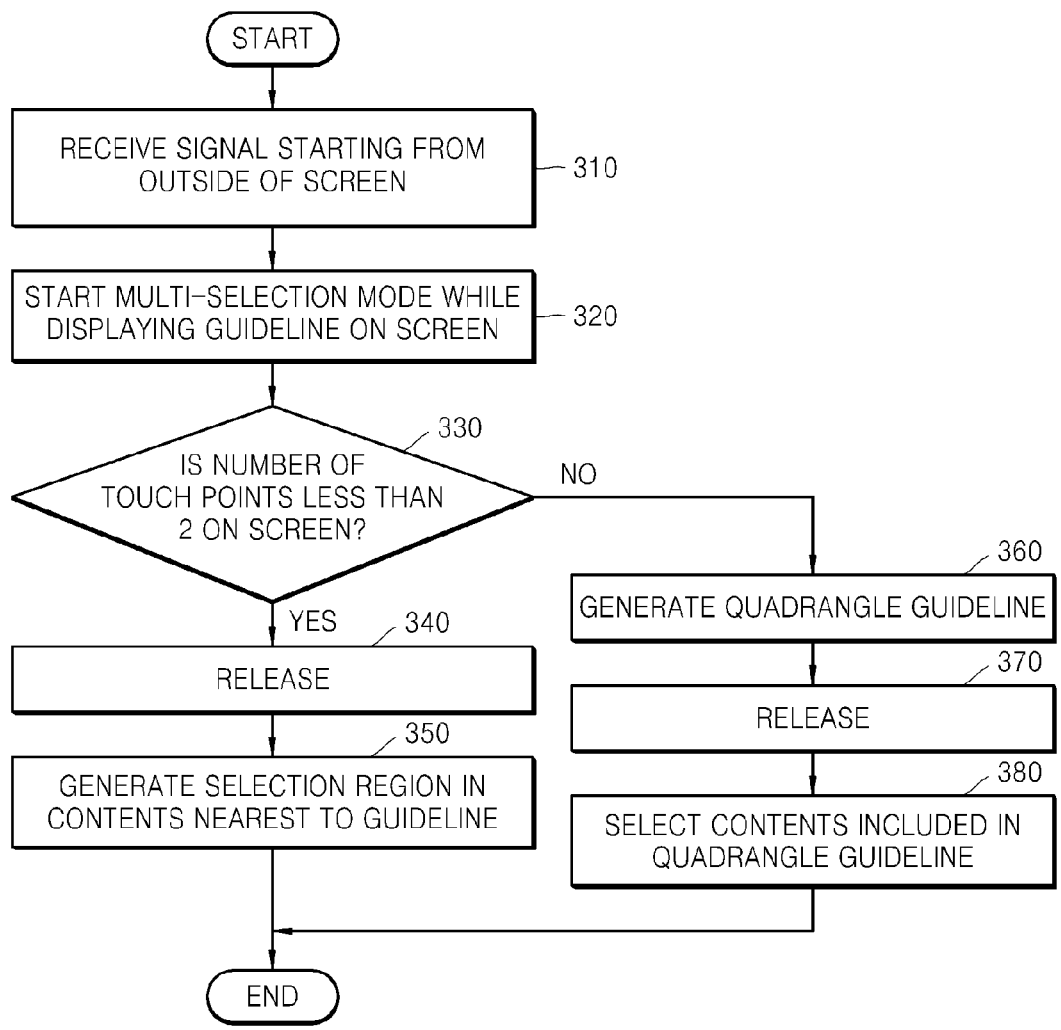
FIG. 3 illustrates the method of selecting a region in a mobile device of FIG. 2 in more detail.

FIG. 3 illustrates the method of selecting a region in the mobile device 100 of FIG. 2 in more detail, and FIGS. 4A through 4C and 5A through 5B illustrate steps in the method of FIG. 3.

Referring to FIG. 3, a signal beginning from outside of a screen of the mobile device 100 is received and recognized, in step 310, such as by arranging an independent sensor separated from a touch screen outside of the mobile device screen and recognizing an input signal from the sensor. In addition, various methods may be considered and will be described in detail with reference to FIGS. 6 through 13.

Figure 4A:
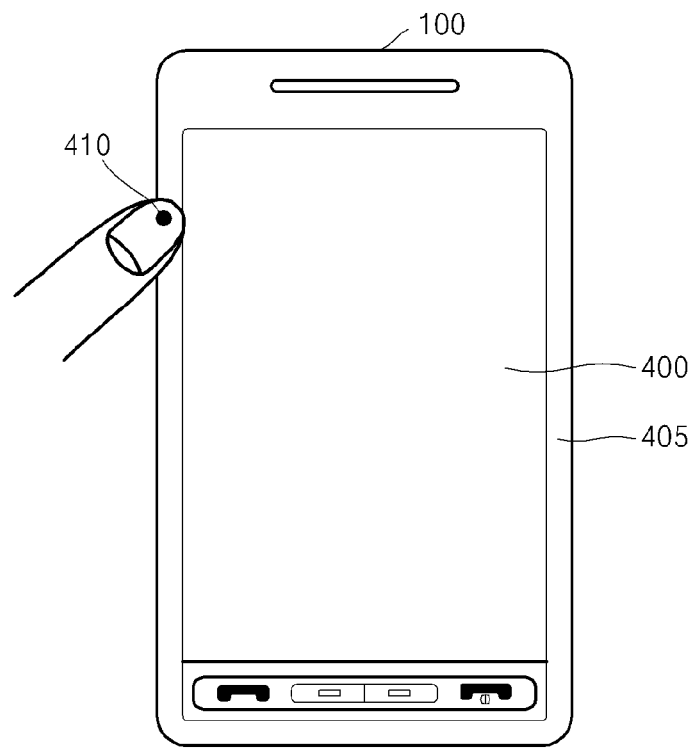
FIGS. 4A through 4C and 5A through 5B illustrate steps in the method of FIG. 3.

Referring to FIG. 4A, a screen 400 of the mobile device 100 is a general touch screen and an independent sensor separated from the touch screen is placed outside 405 of the screen 400. A signal is received according to a user's touch 410 starting from outside 405 of the screen 400.

Figure 4B:
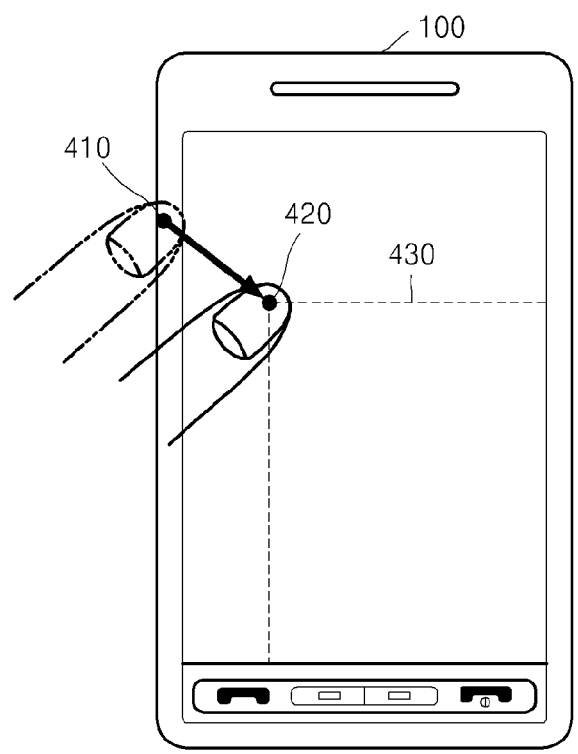

Then, a guideline is displayed on the screen 400 and a multi-selection mode is started, in step 320. Referring to FIG. 4B, when a user's finger starts from outside 405 of the screen 400 and enters into the screen 400 by dragging, a guideline 430 is displayed based on a touch point 420 where the user's finger touches the screen, using various methods. However, in FIG. 4B, the guideline 430 is displayed as an x-axis and a y-axis based on the touch point 420, so that a user may immediately and easily recognize the guideline 430. Displaying of the guideline 430 is provided for a user to predict which part is to be selected; thus, displaying of a guideline is optional.

In step 330, it is determined whether the number of touch points is less than 2 on the screen step.

When the number of touch points is less than 2, that is, when the number of touch points is one and the corresponding touch is released, in step 340, and contents nearest to the guideline 430 are determined as a selection region, in step 350.

Figure 4C:
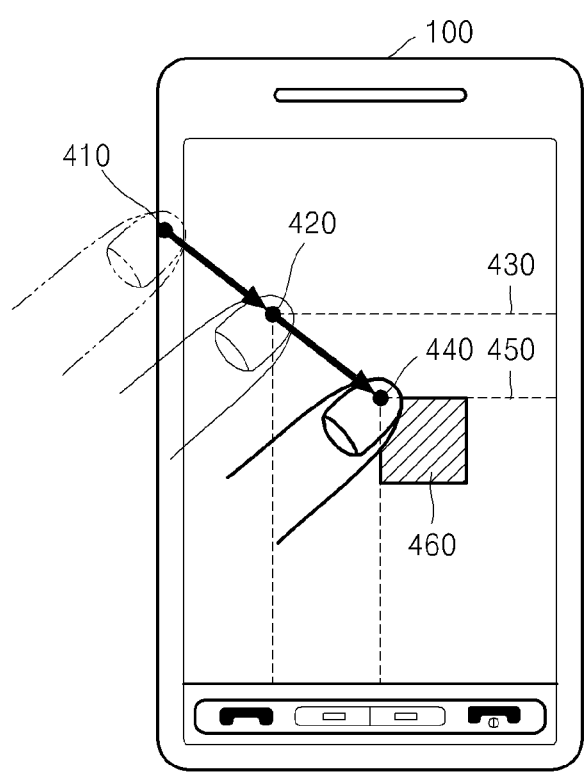

FIG. 4C illustrates the step when the number of touch points is less than 2.

Referring to FIG. 4C, the user's finger further moves to a touch point 440 from the touch point 420 and thereby a guideline 450 is displayed based on the touch point 440. When the touch point 440 is one touch input and then the user releases his/her finger from the touch point 440 on the screen 400, contents 460 nearest to the touch point 440 and the guideline 450 are selected as a selection region.

Otherwise, when the number of touch points is not less than 2 on the screen 400, that is, when the number of touch points is 2, in step 330, a quadrangle guideline is generated, in step 360. When the user's finger is released, in step 370, contents included in the quadrangle guideline are selected, in step 380.

Steps when the number of touch points is 2 are described with reference to FIGS. 5A and 5B.

Figure 5A:
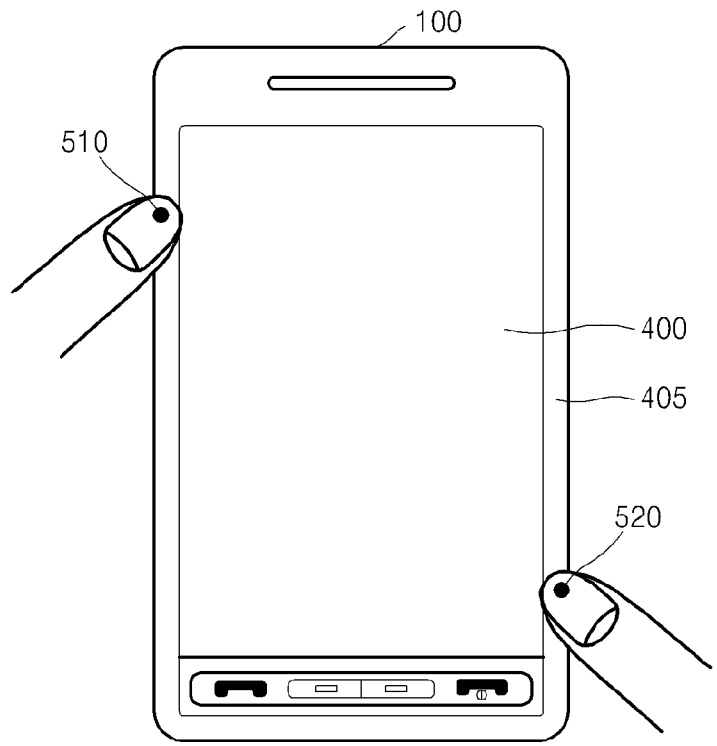

Referring to FIG. 5A, a signal 510 by a first finger of a user and a signal 520 by a second finger of the user are simultaneously received from outside 405 of the screen 400 of the mobile device 100.

Figure 5B:
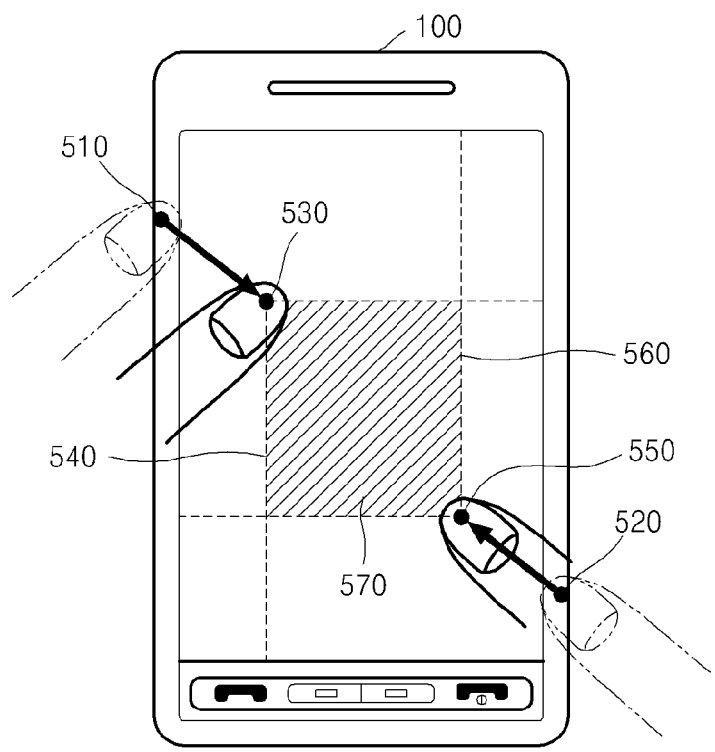

Referring to FIG. 5B, the first finger (at touch point 510) and the second finger (at touch point 520) each enter into the screen 400 to be located at a touch point 530 and a touch point 550, respectively. A guideline 540 is displayed based on the touch point 530 of the first finger and a guideline 560 is displayed based on the touch point 550 of the second finger. Since the number of the touch points in the screen is 2, a quadrangle guideline is generated by the guideline 540 and the guideline 560. When the first and second fingers are released, contents 570 included in the quadrangle guideline become a selection region. In FIGS. 5A and 5B, two fingers simultaneously enter into the screen; however, the present invention is not limited thereto. Since two touches are recognized in the screen if one finger first enters into the screen and the other finger touches or taps before releasing the firstly entered finger, one finger may first enter into the screen and the other finger may touch or tap before releasing the firstly entered finger.

Figure 6:
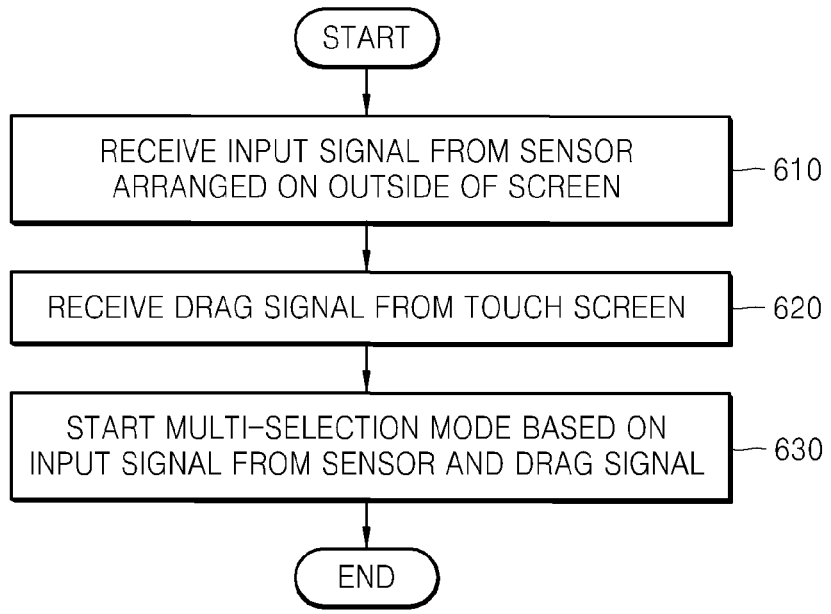
FIG. 6 illustrates a method of receiving and recognizing a signal starting from outside of a screen of a mobile device, according to an embodiment of the present invention.

FIG. 6 illustrates a method of receiving and recognizing a signal starting from outside of a screen of the mobile device 700, according to a first embodiment of the present invention.

Figure 7:
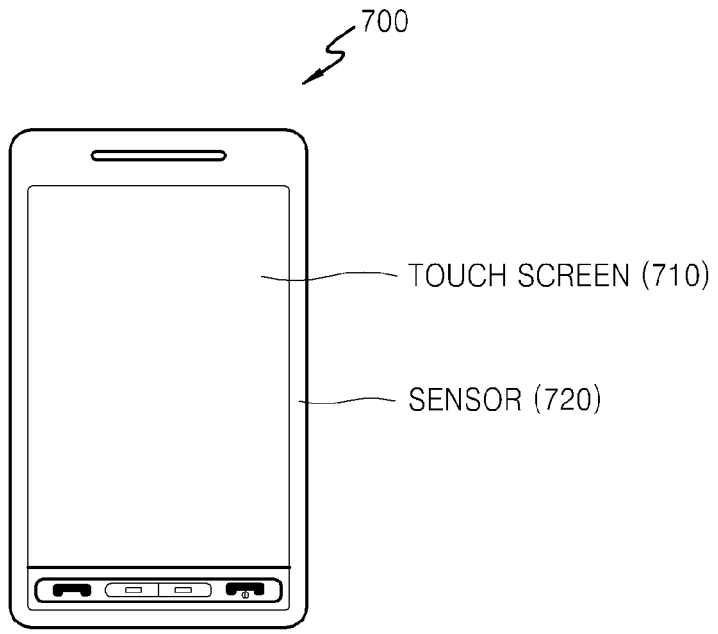
FIG. 7 illustrates a mobile device in which a sensor is arranged on the outside of a screen.

Referring to FIG. 6, an input signal is received from a sensor arranged outside of the screen, in step 610. As illustrated in FIG. 7, the screen of the mobile device 700 is a general touch screen 710 and a sensor 720 is arranged outside of the touch screen 710 in a location known as a bezel. When a user starts touching the mobile device 700 from outside of the screen 710 instead of on the screen 710, the mobile device 700 receives an input signal from the sensor 720 arranged outside of the screen 710. When a drag signal is received from the touch screen 710, in step 620, a multi-selection mode starts based on the input signal from the sensor 720 arranged outside of the screen 710 and the drag signal from the inside of the screen 710, in step 630.

Figure 8:
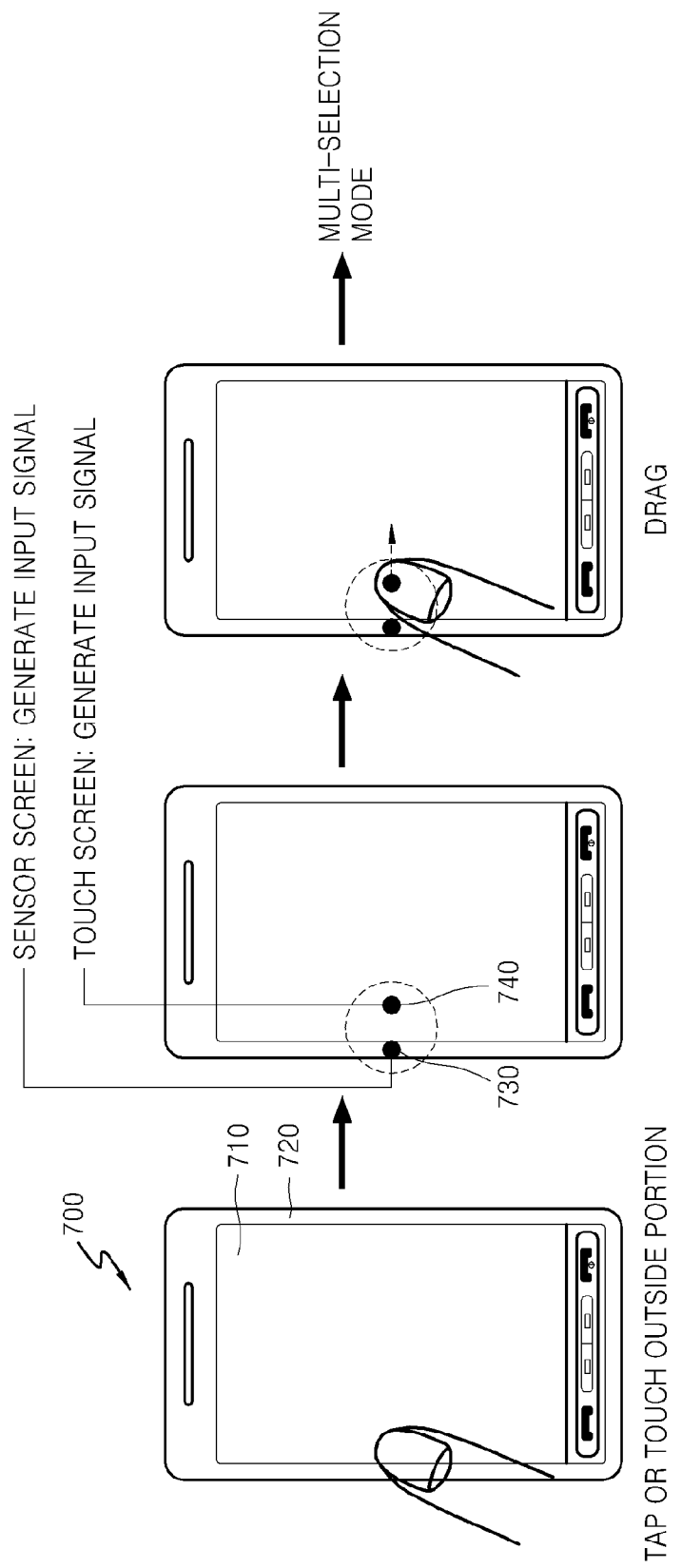
FIG. 8 is a view explaining reception of a signal from a sensor arranged on the outside of a screen, the signal starting from the outside of the screen.

FIG. 8 illustrates reception of a signal from the sensor 720 arranged outside of the screen 710, the signal starting outside of the screen 710.

Referring to FIG. 8, when a user first taps or touches a sensor 720 arranged outside of the screen 710, a sensor input signal is generated at point 730. Then, when a user drags onto 740 the touch screen, an input signal is generated from on 740 the touch screen 710. The mobile device 700 may enter into a multi-selection mode due to the sensor input signal and the drag signal from the touch screen 710.

Figure 9:
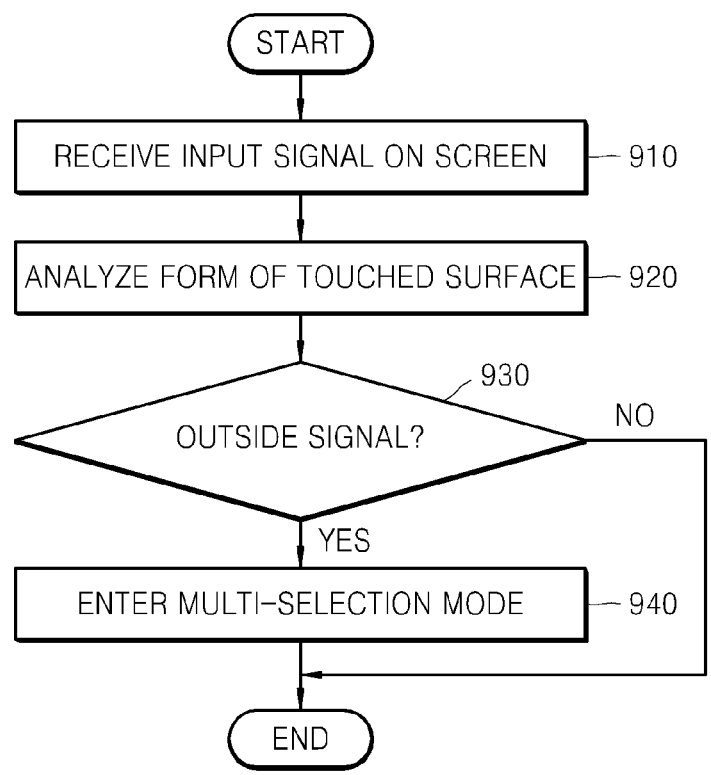
FIG. 9 illustrates a method of receiving and recognizing a signal starting from outside of a screen of a mobile device, according to another embodiment of the present invention.

FIG. 9 illustrates a method of receiving and recognizing a signal starting from outside of a screen of a mobile device, according to a second embodiment of the present invention.

Referring to FIG. 9, an input signal is received from a touch screen, in step 910.

A form of the touched surface is analyzed, in step 920.

The touched surface is analyzed to determine whether the input signal is an outside signal, in step 930. If it is determined that the input signal is not an outside signal, the method is completed; otherwise, if it is determined that the input signal is an outside signal, a multi-selection mode starts, in step 940.

FIGS. 10A and 10B are views for explaining the method of FIG. 9.

In the method of FIG. 9, any touch sensor is arranged outside of a mobile device 1000. However, in order to determine whether an input signal is received from outside of a screen, a form of the touched surface on a touch screen is analyzed.

Referring to FIG. 10A, when a user performs a touch step on 1010 the screen of the mobile device 1000, a touched surface is recognized as a complete finger shape indicated by reference numeral 1020, and such a signal is recognized as a general touch.

Referring to FIG. 10B, when a user starts touching the mobile device 1000 from outside 1030 the touch screen, a firstly recognized signal may be recognized as a straight line form, in which a part of the form is cut, indicated by reference numeral 1040, instead of a complete finger shape. When such a form is recognized, it may be determined that the touch is performed from the outside 1030 of the screen, instead of the inside of the screen, and thereby, the input signal may be determined as an outside signal.

Figure 11:
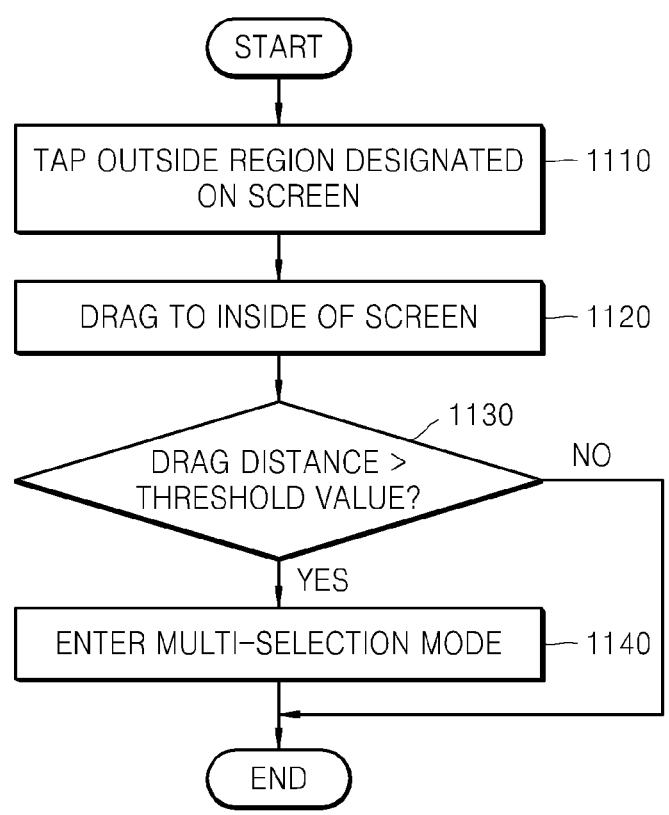
FIG. 11 illustrates a method of receiving and recognizing a signal starting from outside of a screen of a mobile device, according to another embodiment of the present invention.

FIG. 11 illustrates a method of receiving and recognizing a signal starting from outside of a screen of a mobile device 1200 according to a second embodiment of the present invention. In the method of FIG. 11, a signal starts from an outside region on a screen, instead of outside the screen, in a mobile device. However, the signal may start outside the screen.

Figure 12A:
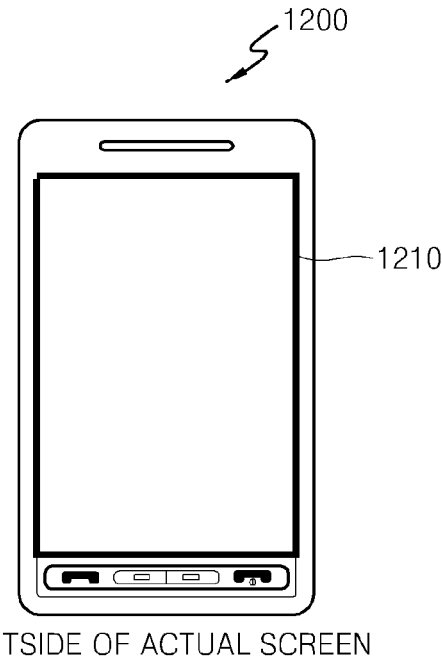
FIGS. 12, 13, and 14 are views for explaining the method of FIG. 11.
Figure 12B:
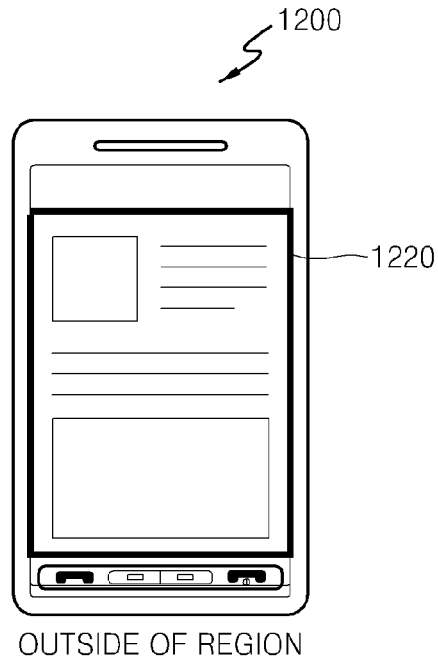

Referring to FIG. 11, a tap signal at an outside region designated on a screen is received, in step 1110. Referring to FIG. 12A, the outside of the screen of the mobile device 1200 is represented by reference numeral 1210. However, referring to FIG. 12B, an outside of a region, on which contents are displayed, is represented by reference numeral 1220. In the mobile device 1200, a frame for displaying a menu or a state of the mobile device 1200 is arranged at the top, bottom, or both the top and the bottom of the screen, and is referred to as "outside of a region for displaying contents" in the screen. Thus, when a tap signal is received from the frame for displaying a state of the mobile device 1200, the tap signal is recognized as a signal received from outside of the screen.

Then, the signal is dragged in an inner direction of the screen, in step 1120.

In step 1130, it is determined whether a drag distance is greater than a threshold value. If the drag distance is greater than the threshold value, a multi-selection mode starts, in step 1140. Otherwise, if the drag distance is not greater than the threshold value, the method is completed.

Figure 13A:
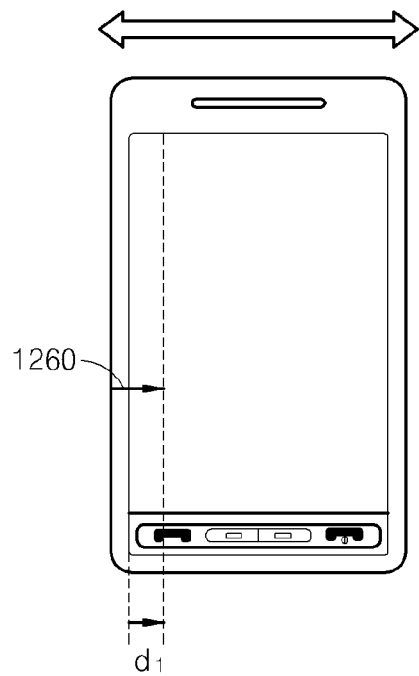

The threshold value is a value for entering into the multi-selection mode. When a scrolling direction of contents displayed on a screen is overlapped with a drag direction for selecting a region, a weight may be given to the threshold value. As illustrated in FIG. 13A, when the contents currently displayed on a mobile device are displayed by a horizontal scroll, a drag signal for selecting contents in a horizontal direction in the mobile device may be confused with a signal by a horizontal scroll. Accordingly, a weight may be given to the minimum drag distance for entering into a multi-selection mode.

Figure 13B:
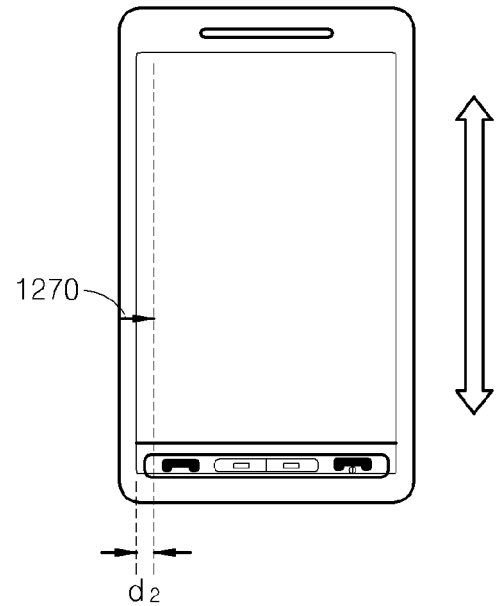

A threshold value d1 when the contents of a mobile device of FIG. 13A are scrolled horizontally may be greater than a threshold value d2 when contents of a mobile device of FIG. 13B are scrolled vertically. FIG. 13A illustrates a case where the contents currently displayed on a mobile device are displayed by a horizontal scroll, and FIG. 13B illustrates a case where the contents currently displayed on a mobile device are displayed by a vertical scroll. Assume that a drag signal for selecting contents in the mobile device is in a horizontal direction. In FIG. 13B, since the scroll direction is in the vertical direction, and the drag signal for selecting contents in the mobile device is in the horizontal direction, there is little confusion between a signal for scrolling and the drag signal for selecting contents. However, in FIG. 13A, since both of the scroll direction and the direction of the drag signal for selecting contents is the same, that is, the horizontal direction, there is confusion as to whether an input signal is for scrolling or for selecting contents. Thus, in FIG. 13B, the threshold value, i.e., the minimum drag distance d2 1270 for entering into a multi-selection mode is relatively small. However, in FIG. 13A, the threshold value, i.e., the minimum drag distance d1 1260 for entering into a multi-selection mode is relatively larger compared to the minimum drag distance d2 1270.

Figure 14A:
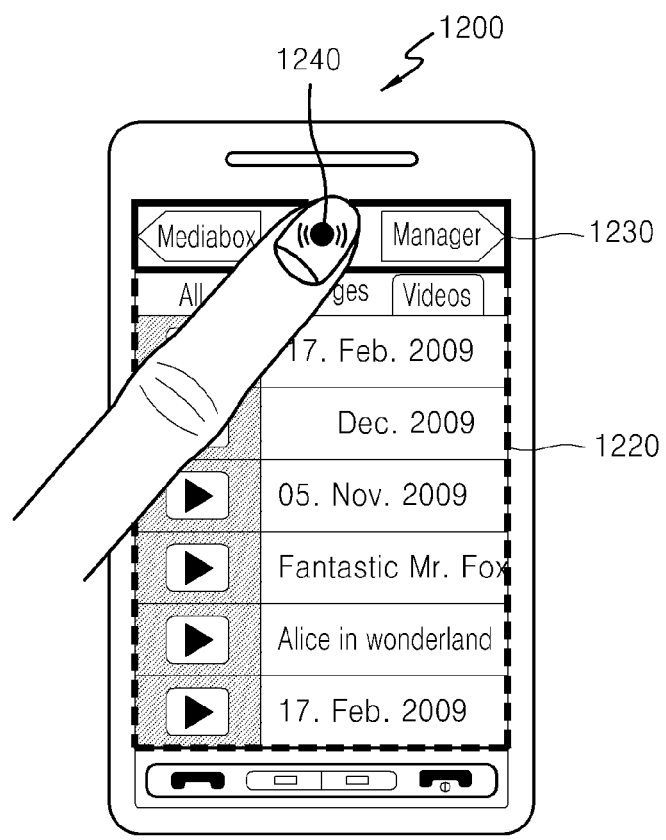
Figure 14B:
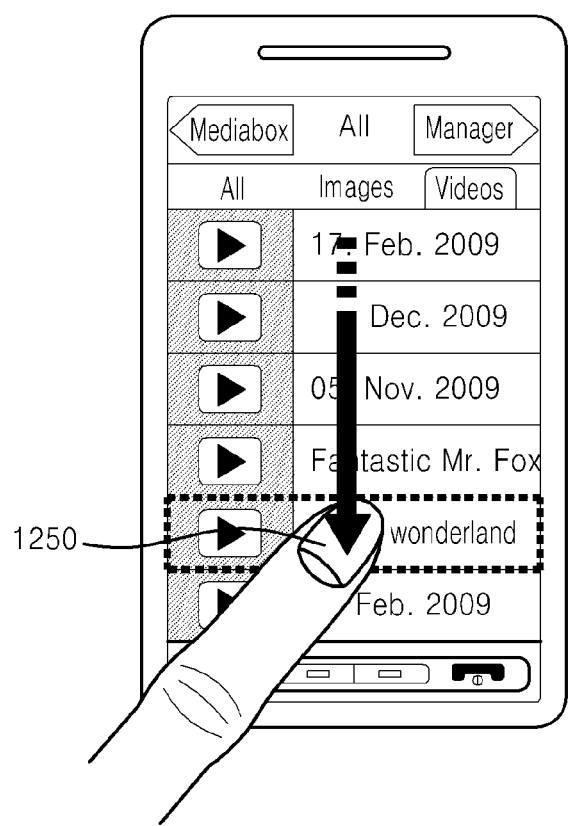

FIGS. 14A and 14B illustrate the method of FIG. 11, that is, an step for selecting contents by using a gesture that contents are entered from outside of a region for displaying the contents.

Referring to FIGS. 14A and 14B, a screen of the mobile device 1200 includes a frame 1230 for displaying a state of contents or a menu, and a frame 1220 for displaying actual contents. When a user finger taps a location 1240 of the frame 1230 for displaying a state of contents or a menu, then drags onto the screen, and releases the finger at a location 1250 of the screen that displays the contents, contents near the location 1250 are designated as a selection region.

As such, even if a sensor is not particularly arranged outside of a screen of a mobile device, a structure on a touch screen, that is, a space for displaying the state of the menu, is used to recognize a signal as entering from outside of the screen, and thus the signal may be used to select contents.

Figure 15A:
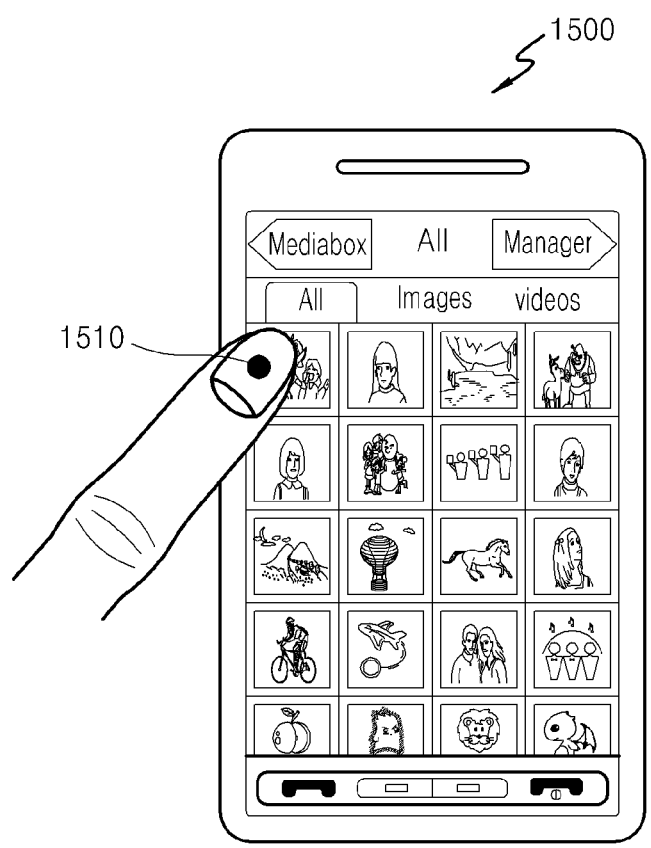
FIGS. 15A through 15C illustrate examples of selecting contents and controlling a selection region using one finger.
Figure 15B:
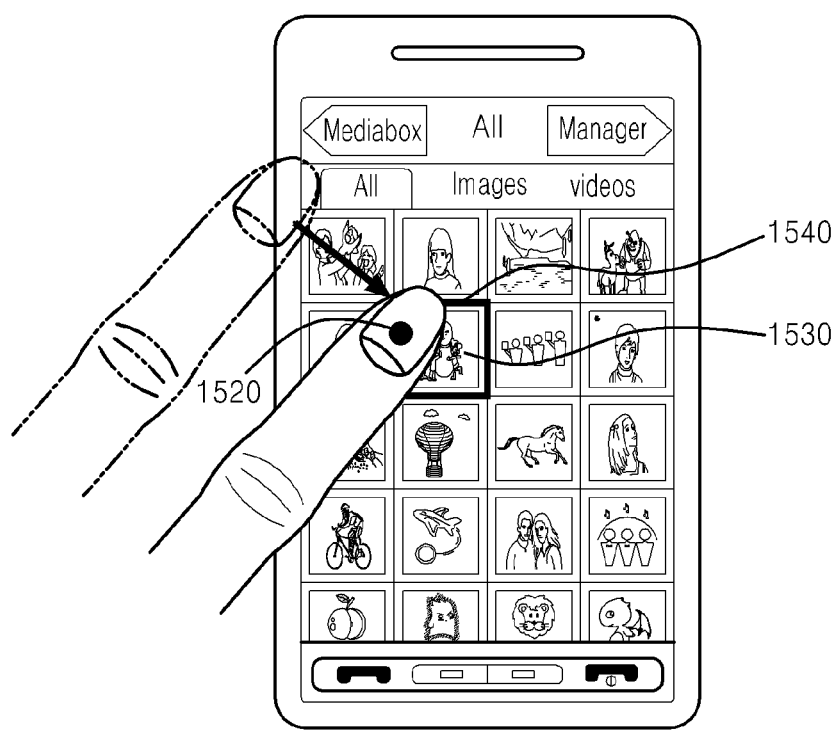
Figure 15C:
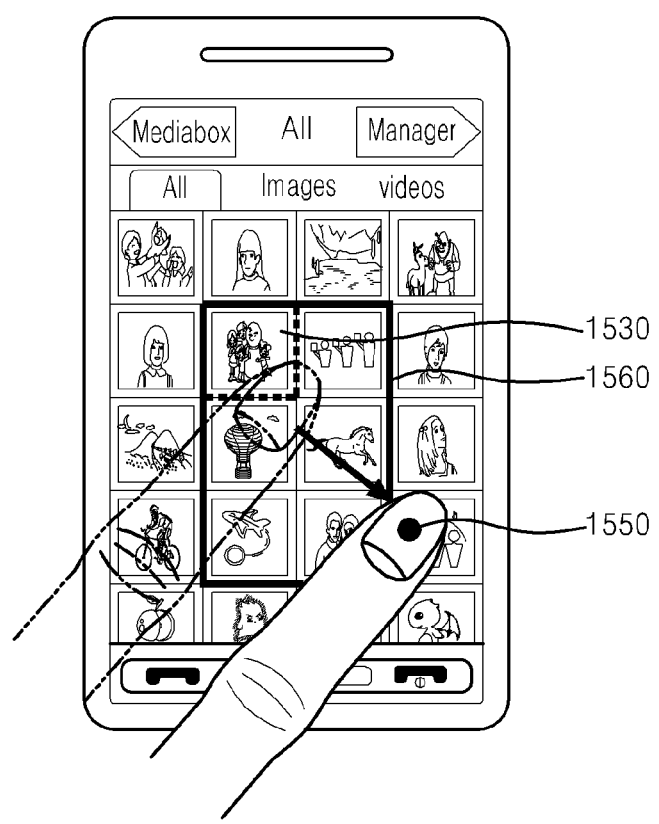

FIGS. 15A, 15B, and 15C illustrate selecting contents and controlling a selection region using one finger.

Referring to FIG. 15A, a user touches a mobile device 1500 starting from outside 1510 of a screen of the mobile device 1500, which recognizes that a signal is input from the outside 1510, and that this step performed by the user is step for selecting contents.

Referring to FIG. 15B, the user drags the finger that touched outside 1510 of the screen of the mobile device 1500 and releases the finger at a location 1520 on the screen. Then, the mobile device 1500 displays the guideline 1540 at the edge of contents 1530 for displaying the contents 1530 nearest to the released location 1520 as a selection region.

Referring to FIG. 15C, the user may further drag the finger for selecting contents other than the selected contents 1530. When the user drags the finger to a location 1550, a portion from the firstly selected contents 1530 to contents within the location 1550 is selected as a selection region, and a guideline 1560 is displayed. The user may control a selection region based on such a step.

Figure 16A:
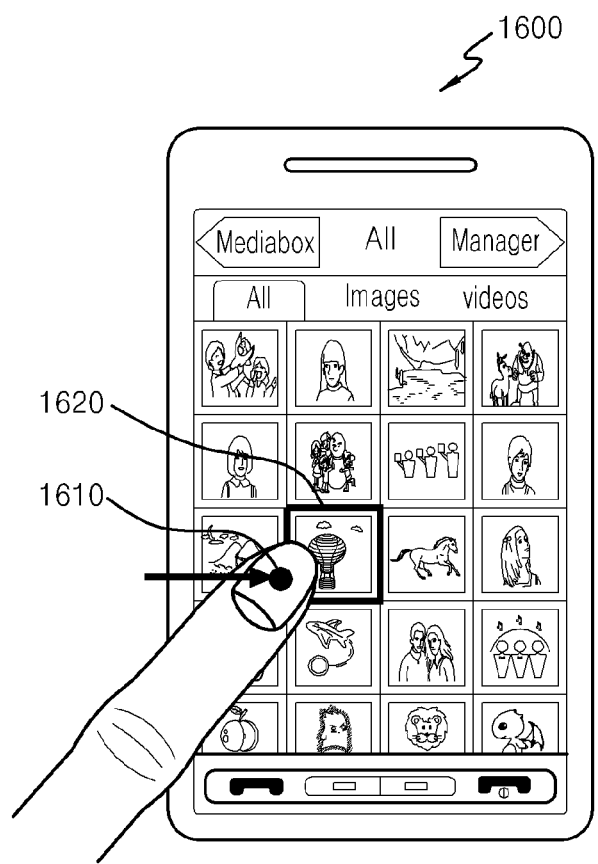
FIGS. 16A and 16B illustrate another example of selecting contents and controlling a selection region using one finger.
Figure 16B:
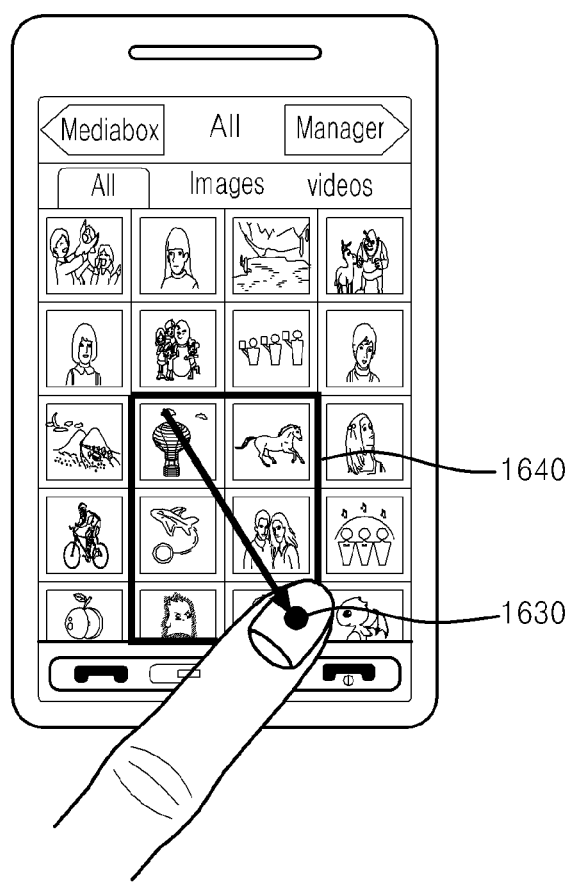

FIGS. 16A and 16B illustrate another example of selecting contents using one finger.

Referring to FIG. 16A, a user touches a mobile device 1600 starting from outside of a screen of the mobile device 1600 with a finger, drags the finger, and releases the finger at a location 1610 on the screen. Then, the mobile device 1600 displays contents nearest to the released location 1610 as a selection region 1620.

Referring to FIG. 16B, when the user further drags the finger for selecting contents other than the selected contents to a location 1630, a portion from the firstly selected contents to contents at the location 1630 is selected as a selection region and a guideline 1640 is displayed. The user may control a selection region based on such an step.

Figure 17A:
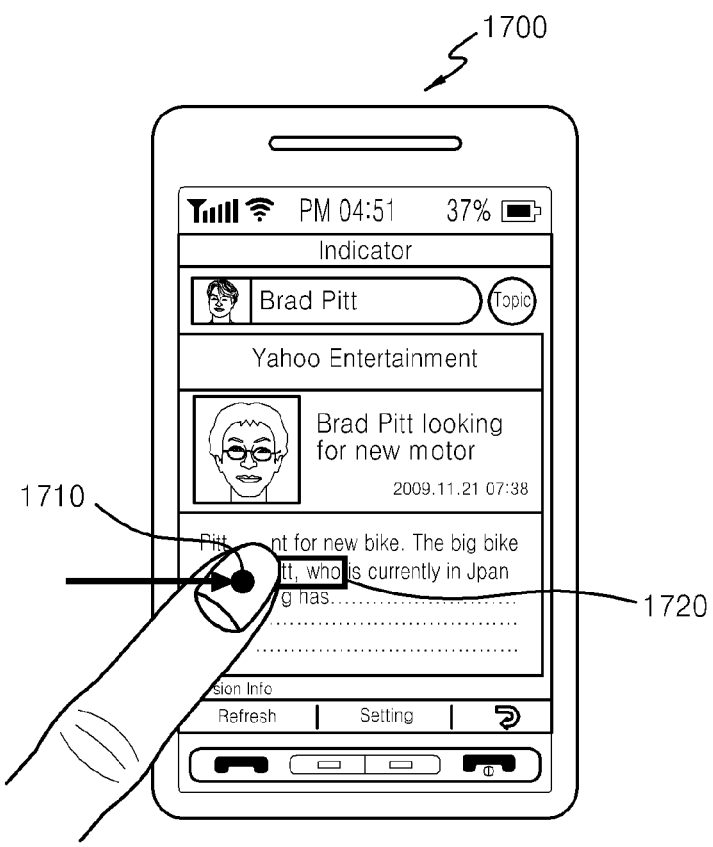
FIGS. 17A and 17B illustrate an example of selecting texts using one finger.
Figure 17B:
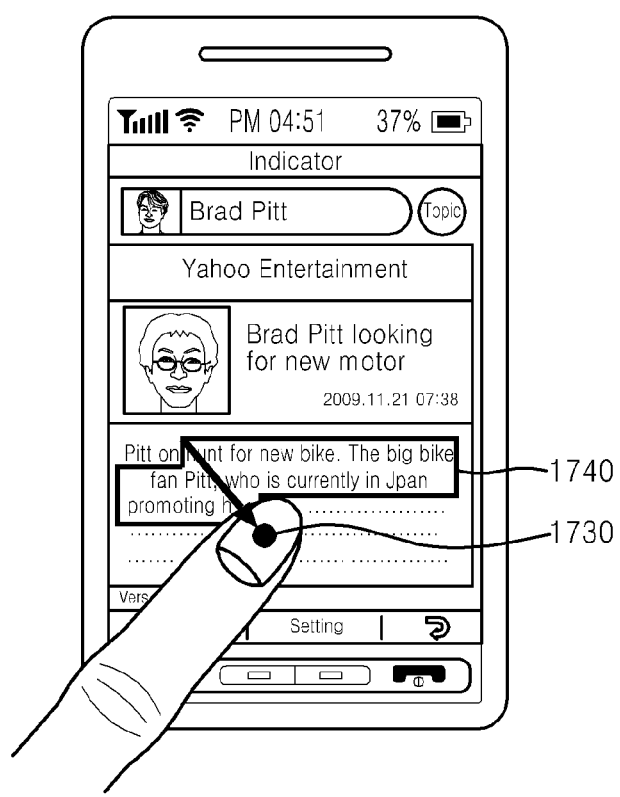

FIGS. 17A and 17B illustrate an example of selecting texts using one finger.

Referring to FIG. 17A, a user touches a mobile device 1700 starting from outside of a screen of the mobile device 1700 and releases the finger at a location 1710 on the screen. Then, the mobile device 1700 displays texts 1720 nearest to the released location 1710 as a selection region.

Referring to FIG. 17B, when the user further drags the finger for selecting texts other than the selected texts to a location 1730, a portion from the firstly selected texts to texts at the location 1730 is selected as a selection region and a guideline 1740 is displayed. The user may control a selection region based on such an step.

Figure 18A:
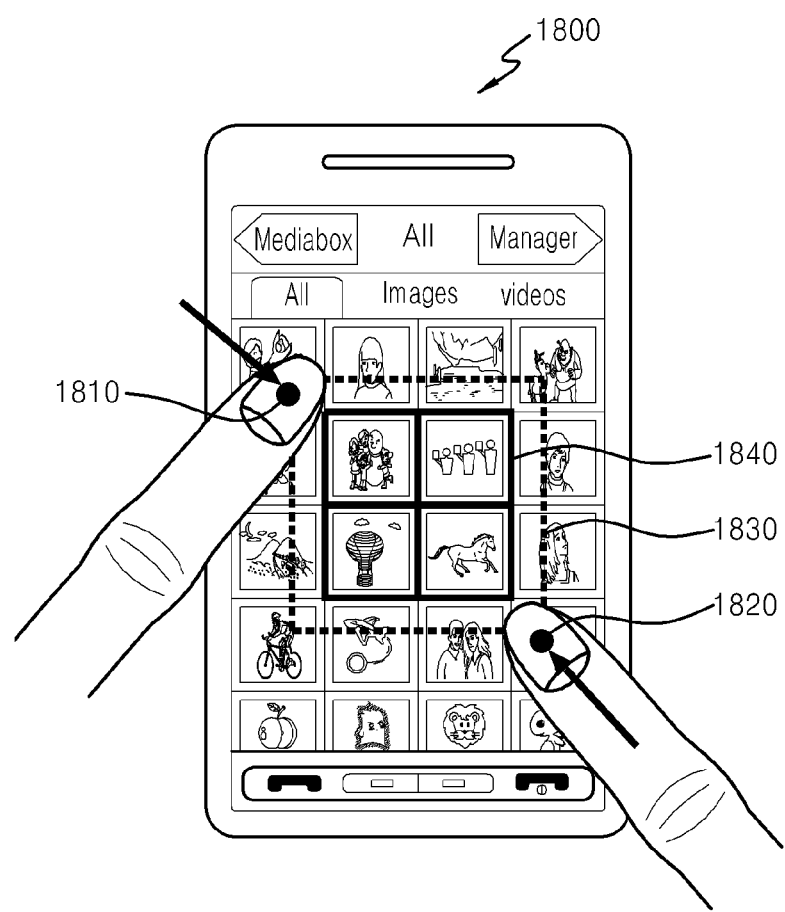
FIGS. 18A and 18B illustrate an example of selecting contents and controlling a selection region using two fingers.
Figure 18B:
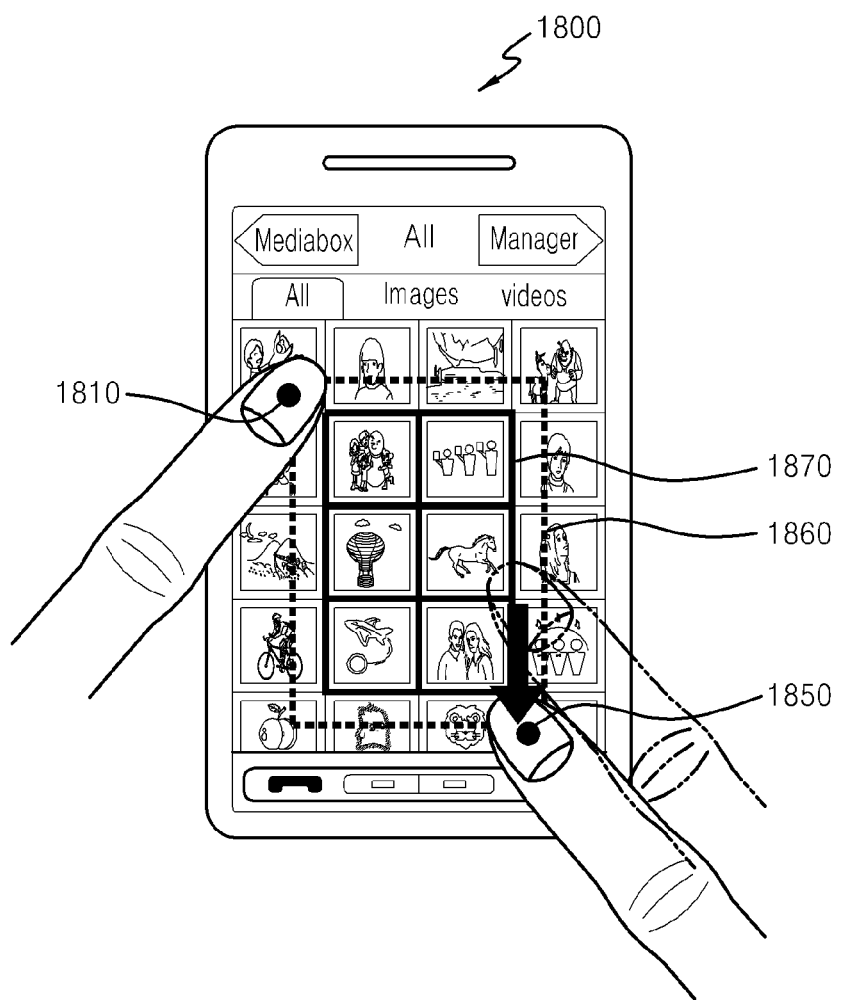

FIGS. 18A and 18B illustrate an example of selecting contents and controlling a selection region using two fingers.

Referring to FIG. 18A, a user touches a mobile device 1800 starting from outside of a screen of the mobile device 1800 simultaneously using two fingers and drags the fingers onto the screen. Then, when a first finger is released at a first location 1810 and a second finger is released at a second location 1820, a quadrangle guideline 1830 is displayed with respect to the first location 1810 and the second location 1820 and contents 1840 included in the guideline 1830 are selected.

Referring to FIG. 18B, the user may further drag the finger for selecting contents other than the firstly selected contents to a third location 1850. When the user drags the second finger to the third location 1850, a portion from the firstly selected contents to contents at the third location 1850 is displayed by the guideline 1860 and contents 1870 included in the guideline 1860 are selected. The user may control a selection region based on such a step.

Figure 19A:
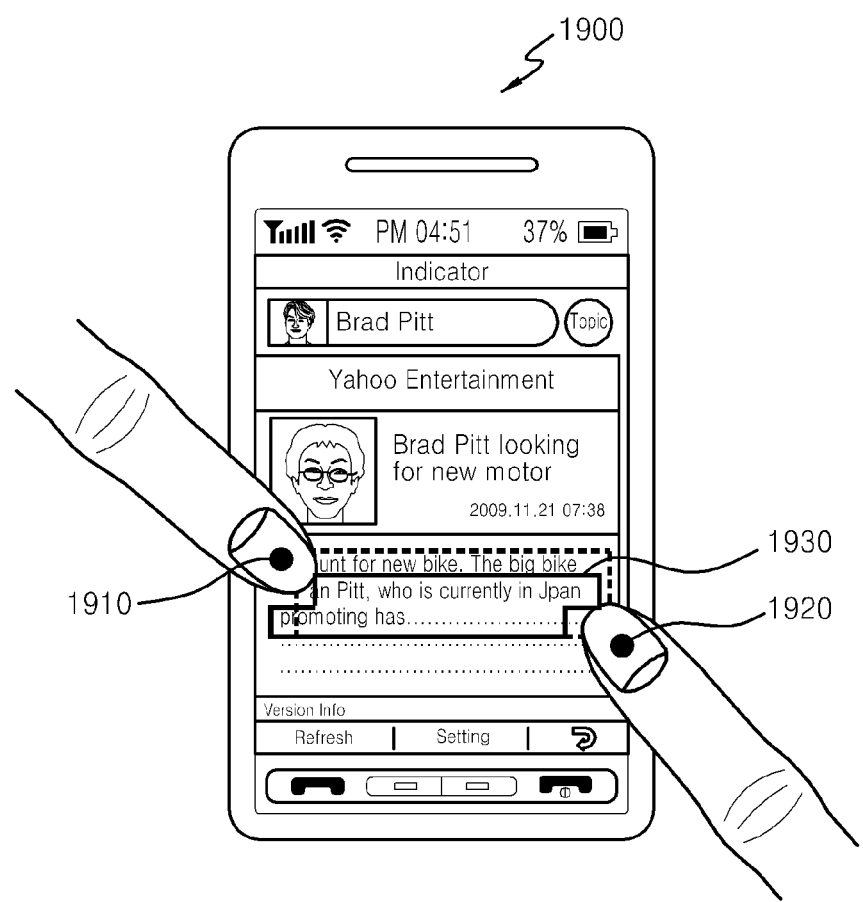
FIGS. 19A and 19B illustrate an example of selecting texts using two fingers.
Figure 19B:
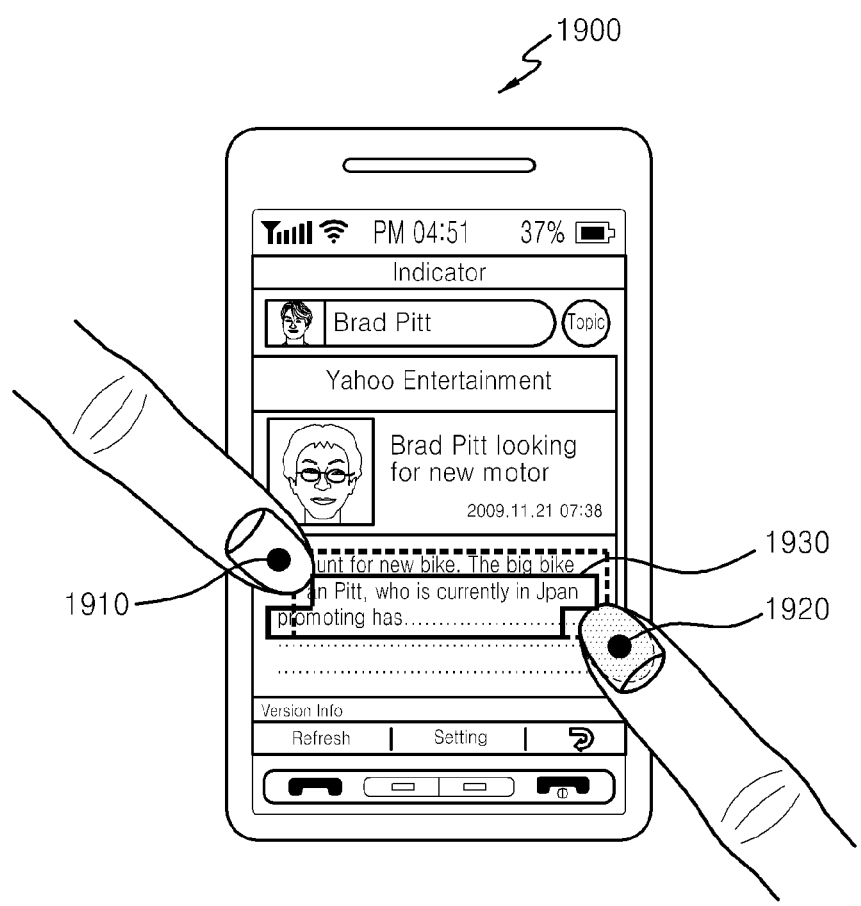

FIGS. 19A and 19B illustrate an example of selecting texts using two fingers.

Referring to FIG. 19A, a user touches a mobile device 1900 starting from outside of a screen of the mobile device 1900 simultaneously using two fingers and drags the fingers onto the screen. Then, when a first finger is released at a first location 1910 and a second finger is released at a second location 1920, texts 1930 from the first location 1910 to the second location 1920 are selected.

Referring to FIG. 19B, the user touches the mobile device 1900 starting from outside of the screen using the first finger and drags the first finger to the inside of the screen. Then, before releasing the first finger at the first location 1910, when the second finger taps or touches the mobile device 1900 at the second location 1920, the texts 1930 from the first location 1910 to the second location 1920 are selected.

Figure 20A:
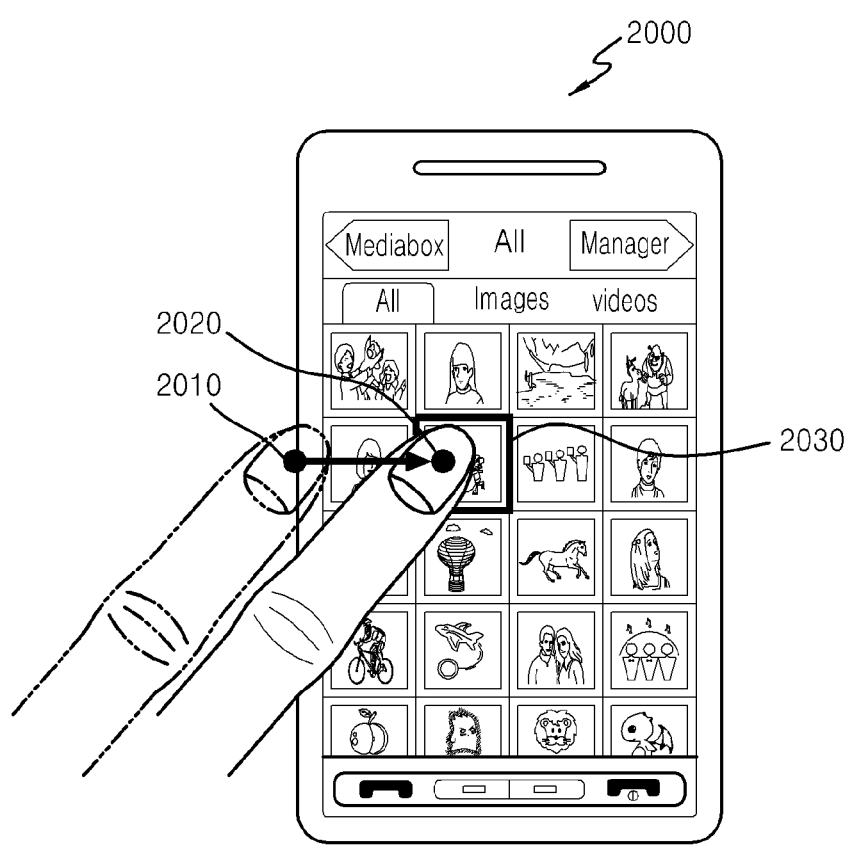
FIGS. 20A through 20C illustrate an example of first selecting contents using one finger and then controlling a selection region using the other finger.
Figure 20B:
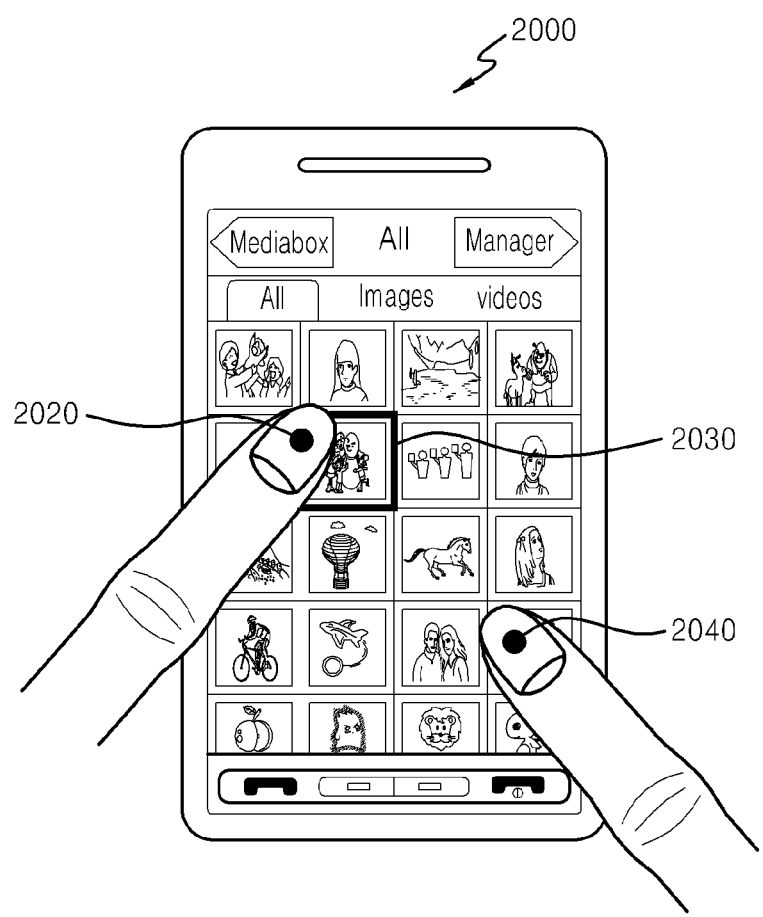
Figure 20C:
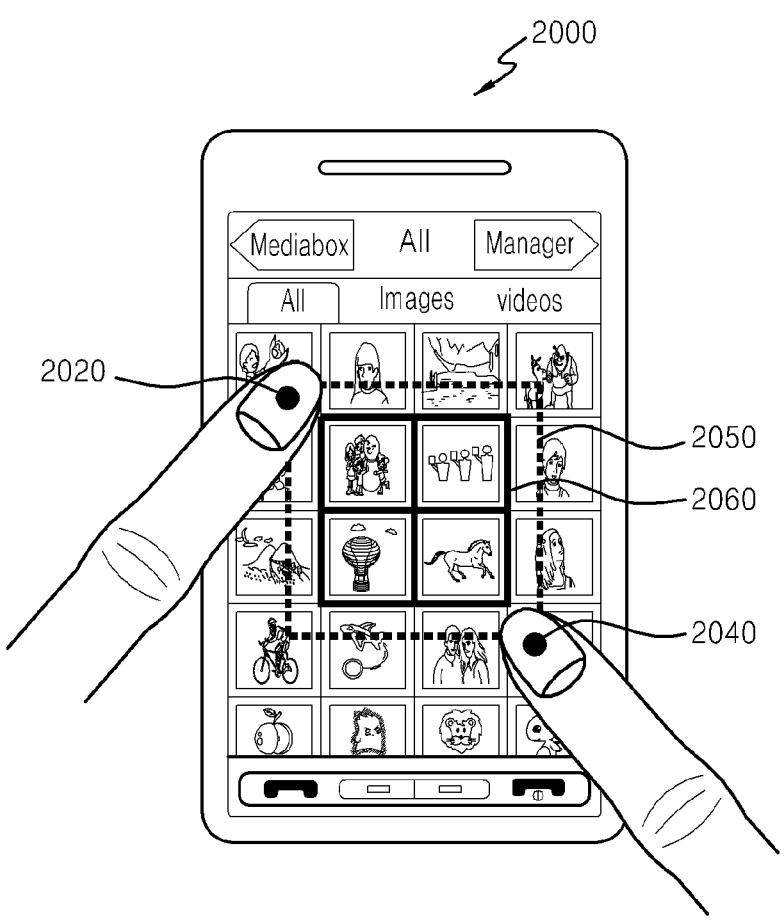

FIGS. 20A through 20C illustrate an example of selecting contents using one finger and then controlling a selection region using the other finger.

Referring to FIG. 20A, a user touches a mobile device 2000 starting from outside 2010 of a screen of the mobile device 2000 using a first finger and drags the first finger to a location 2020 on the screen. The mobile device 2000 displays contents nearest to the location 2020 as a selection region 2030.

Referring to FIG. 20B, before releasing the first finger, the user taps or touches a second location 2040 in the screen using a second finger.

Referring to FIG. 20C, a quadrangle guideline 2050 is displayed based on the first location 2020 and the second location 2040 by the tap or the touch of the second finger and contents 2060 included in the guideline 2050 are selected.

Figure 21A:
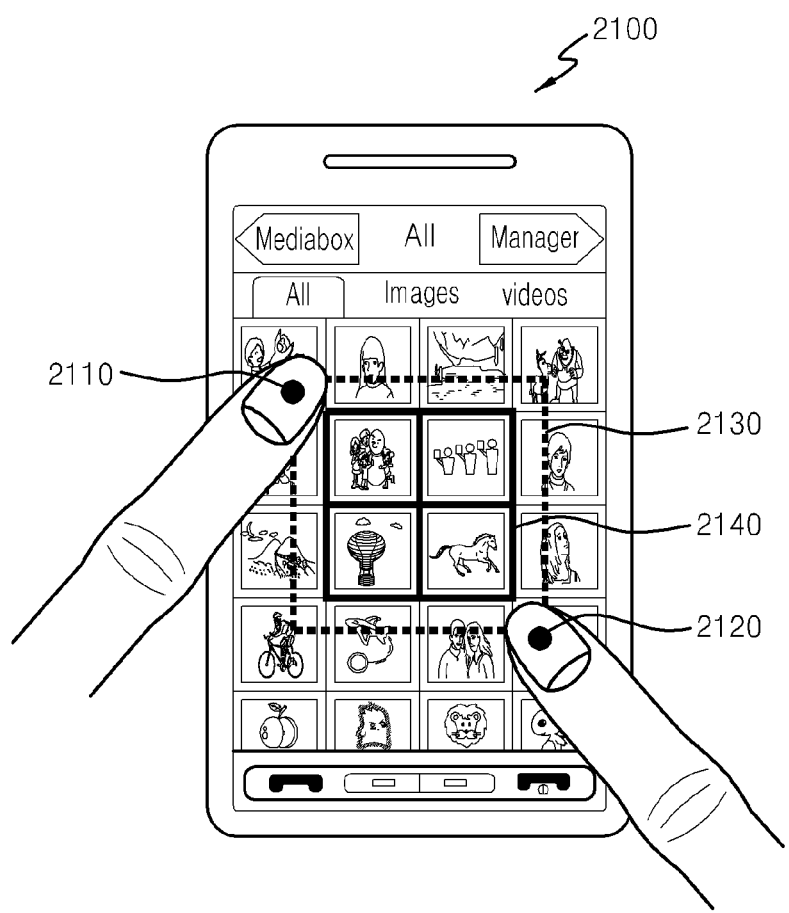
FIGS. 21A and 21B illustrate a range of contents selected based on a guideline.
Figure 21B:
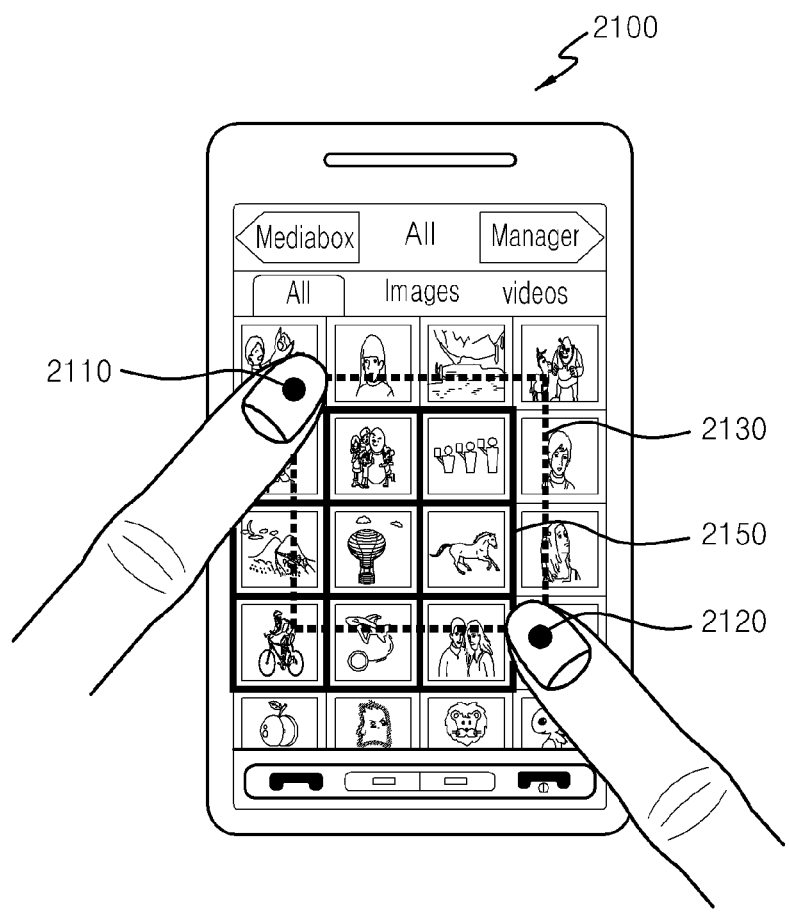

FIGS. 21A and 21B illustrate a range of contents selected based on a guideline.

When a guideline is generated by one or two fingers, selection of contents for a selection region based on the guideline may become difficult. That is, no consideration is required when the guideline is accurately matched with a range of contents. However, it is difficult for a user who actually uses a mobile device to accurately control their fingers according to the range of contents, so that the contents that are selected as a selection region based on the guideline needs to be considered.

FIG. 21A illustrates an example of only selecting contents included in a guideline.

Referring to FIG. 21A, when a user of a mobile device 2100, drags two fingers from the outside of a screen and releases a first finger at a first location 2110 and a second finger at a second location 2120, a quadrangle guideline 2130 is generated. In FIG. 21A, contents 2140 in the guideline 2130, that is, the contents 2140 completely included in the guideline 2130, are selected.

FIG. 21B illustrates an example of selecting contents when a region of a guideline holds n percent (n %) or more of the contents.

Referring to FIG. 21B, a user of a mobile device 2100, drags two fingers from the outside of a screen and releases a first finger at a first location 2110 and a second finger at a second location 2120 so that a quadrangle guideline 2130 is generated. In FIG. 21B, even if contents are not completely included in the guideline, n % or more of contents 2150 included in the guideline 2130, may be selected. Here, n may be determined in various manners according to an intention of a mobile device manufacturer or a program designer.

Figure 22A:
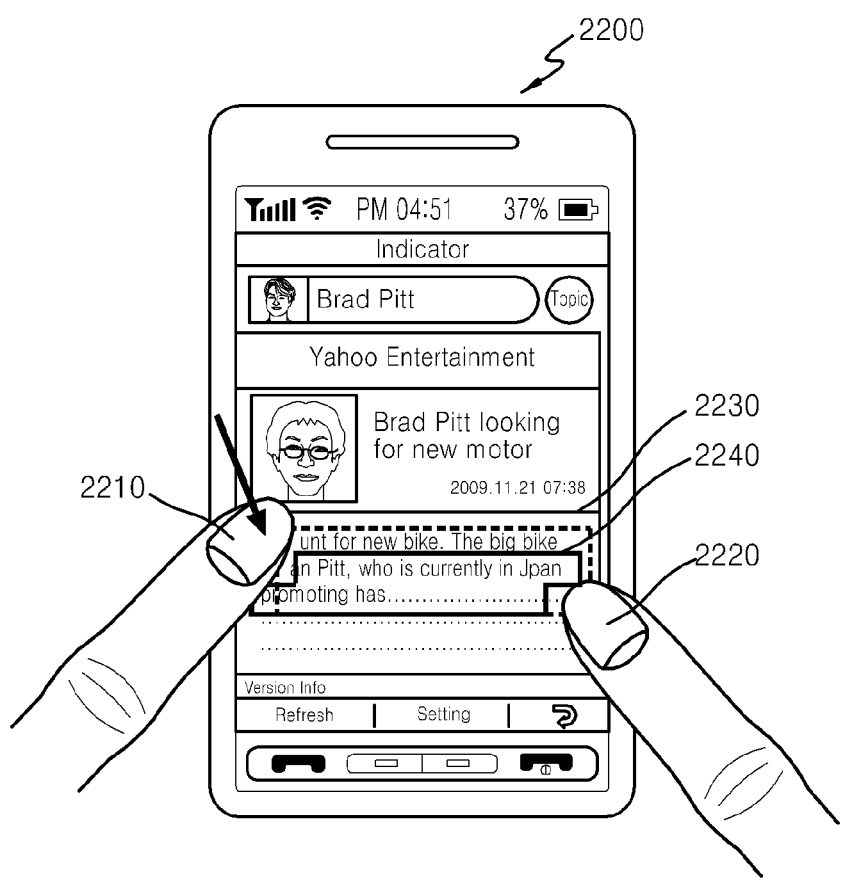
FIGS. 22A and 22B illustrate a range of texts selected based on a guideline.
Figure 22B:
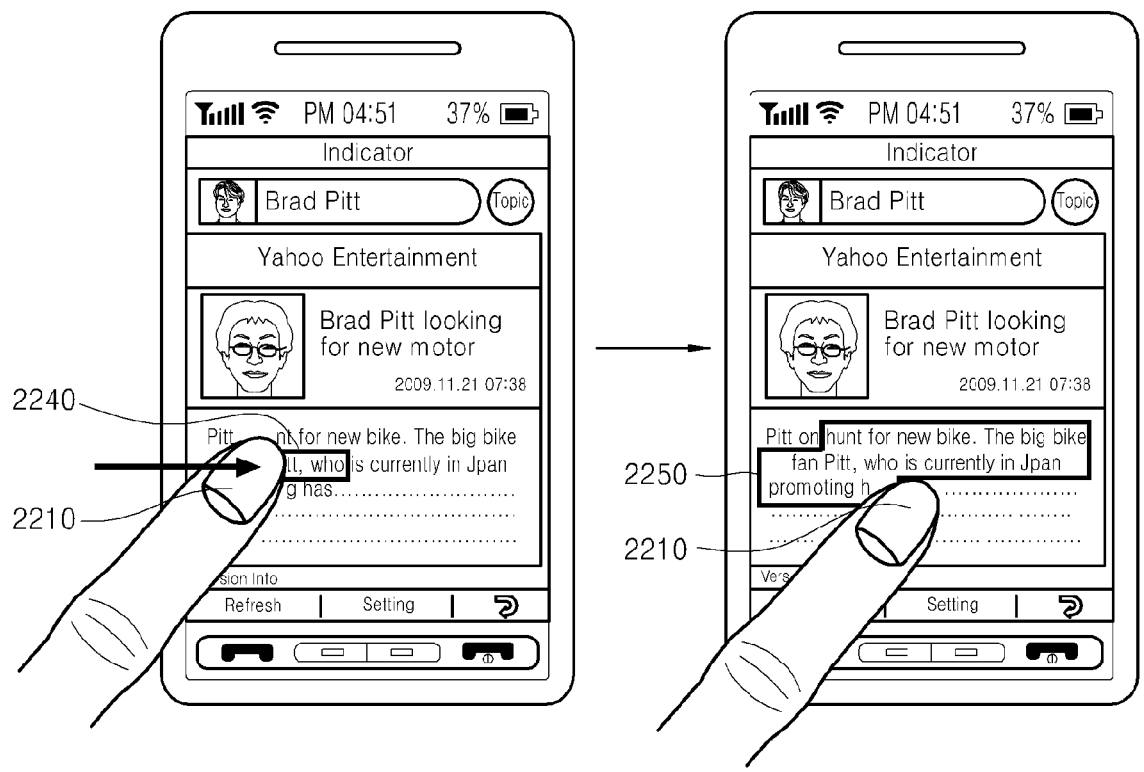

FIGS. 22A and 22B illustrate a range of texts selected based on a guideline.

FIG. 22A illustrates a range of text selected using two fingers.

Referring to FIG. 22A, when a user of a mobile device 2200, drags two fingers from the outside of a screen and releases a first finger at a first location 2210 and a second finger at a second location 2220, a quadrangle guideline 2230 is generated. In FIG. 22A, continuous text 2240 from the start to the end of a sentence is selected from texts included in the guideline 2230. Here, the start and the end may indicate, for example, the start and the end of a full sentence.

FIG. 22B illustrates a range of text selected using one finger.

Referring to FIG. 22B, a user of the mobile device 2200, drags one finger from outside of a screen and releases the finger at a location 2210 so that texts 2240 nearest to the location 2210 are selected. For example, one word may be first selected as the nearest texts. Then, the user controls a location of the finger so as to control a text selection region 2250.

According to the present invention, a signal entering from outside of a screen of a mobile device is used to select contents. Thus, reliability in selecting contents increases without confusion of the entering signal with other signals, and a user may more easily use the mobile device.

The present invention can also be embodied as computer-readable codes on a computer-readable recording medium. The computer-readable recording medium is any data storage device that can store data that can be thereafter read by a computer system. Examples of the computer-readable recording medium include Read-Only Memory (ROM), Random-Access Memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A method of selecting content on a screen of a device, the method comprising:
   presenting a plurality of icons on the screen;
   receiving at least one dragging touch input dragged from an outside area of the screen onto the screen;
   displaying a guideline on the screen of the device based on the at least one dragging touch input dragged from the outside area of the screen onto the screen; and
   selecting at least one icon from among the plurality of icons based on a location where the at least one dragging touch input is released on the screen, and a number of the at least one dragging touch input which represents a number of touch points dragged from the outside area of the screen onto the screen, by:
   selecting, in response to receiving a first dragging touch input dragged from the outside area of the screen onto the screen, the at least one icon nearest a location where the first dragging touch input is released,
   selecting, response to receiving a second dragging touch input dragged from the outside area of the screen onto the screen after receiving the first dragging touch input, the at least one icon within an area defined by locations where the first dragging touch input and the second dragging touch input are released, and
   selecting, in response to receiving a touch input selecting a position on the screen after receiving the first dragging touch input, the at least one icon within an area defined by locations where the first dragging touch input is maintained and the selected position, wherein the touch input is received after the first dragging touch input is dragged onto the screen and is maintained.

2. The method of claim 1, wherein receiving the at least one dragging touch input comprises recognizing, on the screen, at least one input signal from a sensor arranged outside of the screen and at least one signal input on the screen.

3. The method of claim 1, wherein receiving the at least one dragging touch input comprises analyzing a form of a touch on the screen and determining the at least one dragging touch input on the screen as resulting from dragging from outside of the screen when less than a complete finger shape is determined as the form of the touch.

4. The method of claim 1, wherein receiving the at least one dragging touch input comprises receiving and recognizing a signal due to dragging from an outside area designated on the screen.

5. The method of claim 1, wherein the touch input comprises a tap signal or a touch signal.

6. An apparatus for selecting content on a screen of a device, the apparatus comprising:
   a display configured to present a plurality of icons on the screen;
   a receiver configured to receive at least one dragging touch input dragged from an outside area of the screen onto the screen; and
   a controller configured to:
   select at least one icon from among the plurality of icons based on a location where the at least one dragging touch input is released on the screen, and a number of the at least one dragging touch input which represents a number of touch points dragged from the outside area of the screen onto the screen, by:
   selecting, in response to receiving a first dragging touch input dragged from the outside area of the screen onto the screen, the at least one icon nearest a location where first the dragging touch input is released,
   selecting, in response to receiving a second dragging touch input dragged from the outside area of the screen onto the screen after receiving the first dragging touch input, the at least one icon within an area defined by locations where the first dragging touch input and the second dragging touch input are released, and
   selecting, in response to receiving a touch input selecting a position on the screen after receiving the first dragging touch input, the at least one icon within an area defined by a location where the first dragging touch input is maintained and the selected position, wherein the touch input is received after the first dragging touch input is dragged onto the screen and is maintained,
   wherein the display is further configured to display a guideline on the screen of the device based on the at least one dragging touch input dragged from the outside area of the screen onto the screen.

7. The apparatus of claim 6, wherein the receiver is further configured to recognize at least one signal input from a sensor arranged outside of the screen and at least one signal input on the screen.

8. The apparatus of claim 6, wherein the receiver is further configured to analyze a form of a touch on the screen and determines the at least one signal input on the screen as resulting from dragging from outside of the screen when less than a complete finger shape is determined as the result of analyzing.

9. The apparatus of claim 6, wherein the receiver is further configured to receive and recognizes a signal due to dragging from an outside area designated on the screen.

10. The apparatus of claim 6, wherein the touch input comprises a tap signal or a touch signal.

11. A non-transitory computer-readable recording medium having recorded thereon a computer program for executing a method of selecting content on a screen of a device, the method comprising:

presenting a plurality of icons on the screen;

receiving at least one dragging touch input dragged from an outside area of the screen onto the screen;

displaying a guideline on the screen of the device based on the at least one dragging touch input dragged from the outside area of the screen onto the screen; and selecting at least one icon from among the plurality of icons based on a location where the at least one dragging touch input is released on the screen, and a number of the at least one dragging touch input which represents a number of touch points dragged from the outside area of the screen onto the screen, by:

selecting, in response to receiving a first dragging touch input dragged from the outside area of the screen onto the screen, the at least one icon nearest a location where the first dragging touch input is released, selecting, in response to receiving a second dragging touch input dragged from the outside area of the screen onto the screen after receiving the first dragging touch input, the at least one icon within an area defined by locations where the first dragging touch input and the second dragging touch input are released, and selecting, in response to receiving a touch input selecting a position on the screen after receiving the first dragging touch input, the at least one icon within an area defined by a location where the first dragging touch input is maintained and the selected position, wherein the touch input is received after the first dragging touch input is dragged onto the screen and is maintained.

12. The method of claim 3, wherein less than the complete finger shape is determined by recognizing a straight line in which a part of the form of the touch is cut off.

13. The apparatus of claim 8, wherein less than the complete finger shape is determined by recognizing a straight line in which a part of the form of the touch is cut off.

14. The method of claim 1, wherein the first dragging touch input and the second dragging touch input are generated by a first touch and a second touch generated by a first finger and a second finger, respectively, of a user of the device.

15. The method of claim 14, wherein the first touch and the second touch are simultaneously received to generate the first dragging touch input and the second dragging touch input.

* * * * *